INVENTORS
Loren E. DeGroot
Joseph A. Parini
Arlan R. VanKoevering
Robert A. Racy
William F. Roth
BY

ATTORNEYS

March 26, 1968 L. E. DE GROOT ET AL 3,375,521
DOPPLER COMPENSATED NAVIGATION SYSTEM
Filed May 7, 1965 10 Sheets-Sheet 5

Robert A. Racy
William F. Roth
BY

INVENTORS
Loren E. DeGroot
Joseph A. Parini
Arlan R. VanKoevering

*Price & Heneveld*
ATTORNEYS

March 26, 1968    L. E. DE GROOT ET AL    3,375,521
DOPPLER COMPENSATED NAVIGATION SYSTEM
Filed May 7, 1965    10 Sheets-Sheet 6

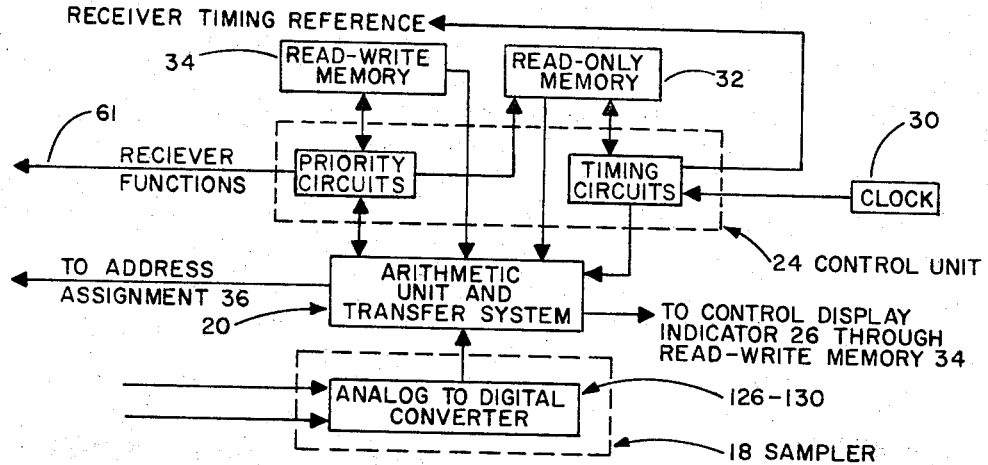

FIG. 7

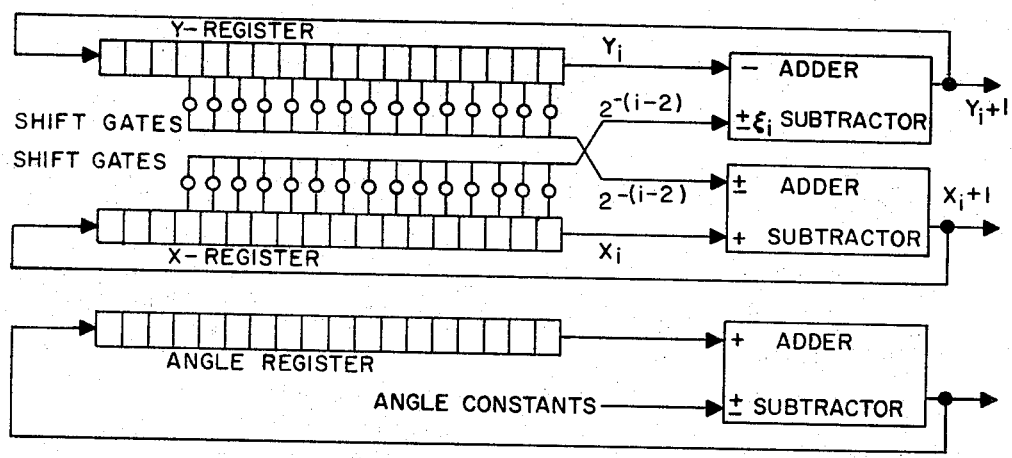

FIG. 8

ROTATION
$x \rightarrow X \rightarrow K(x \cos \Psi - y \sin \Psi)$
$y \rightarrow Y \rightarrow K(x \sin \Psi + y \cos \Psi)$
$\Psi \rightarrow A \rightarrow 0$ RESOLUTION
$x \rightarrow X \rightarrow K\sqrt{x^2 + y^2}$
$y \rightarrow Y \rightarrow 0$
$\Psi \rightarrow A \rightarrow \arctan y/x$

FIG. 9

Robert A. Racy
William F. Roth
BY

INVENTORS
Loren E. DeGroot
Joseph A. Parini
Arlan R. VanKoevering

Price & Heneveld
ATTORNEYS $$a_i = \tan^{-1} 2^{-(i-2)}$$

BY SIMILAR TRIANGLES $$\frac{\Delta x}{y_i} = \frac{2^{-(i-2)} R_i}{R_i}$$

$$\Delta x = 2^{-(i-2)} y_i$$

$$\boxed{x_{i+1} = x_i + 2^{-(i-2)} y_i}$$ ALSO $$\boxed{y_{i+1} = y_i - 2^{-(i-2)} R_i 2}$$

$$R_{i+1} = \sqrt{R_i^2 + 2^{-(i-2)} R_i 2}$$

$$\boxed{R_{i+1} = R_i \sqrt{1 + 2^{-2(i-2)}}}$$

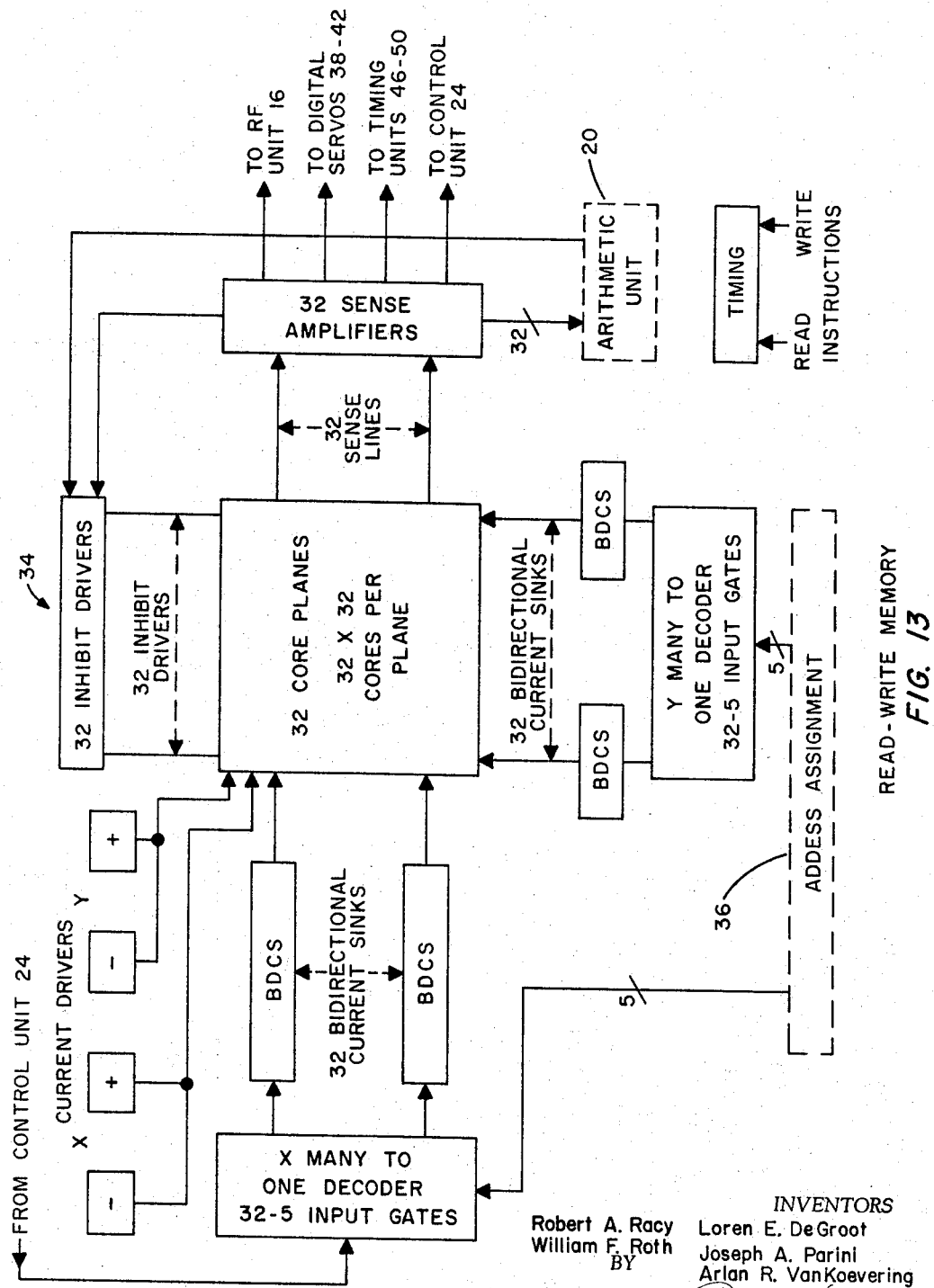

United States Patent Office 3,375,521
Patented Mar. 26, 1968

3,375,521
DOPPLER COMPENSATED NAVIGATION
SYSTEM
Loren E. De Groot, Ann Arbor, and Joseph A. Parini, Arlan R. Van Koevering, William F. Roth, and Robert A. Racy, Grand Rapids, Mich., assignors to Lear Siegler, Inc.
Filed May 7, 1965, Ser. No. 454,073
17 Claims. (Cl. 343—103)

ABSTRACT OF THE DISCLOSURE

A unitary, integrated navigation instrument in which RF receiving and sampling operations and hyperbolic co-ordinate conversion operations are provided by time-sharing functional component groupings forming a sampler stage or section, an arithmetic unit, a memory and a detector and sequential decoder section with a basic RF turning unit and with each other through the operation of a control unit including timing and priority circuits, to form an instrument which does not have a separate receiver and a computer-converter, but which nonetheless performs the functions of both. Also, the computer operation so provided will compute the approximate Doppler shift undergone by signals to be initially received from a transmitting station complex, based upon present position information which is known to the pilot and inserted by him into the computer, and upon present aircraft velocity information preferably inserted into the computer by a typical synchro and analog to digital converter, based on standard aircraft velocity-indicating instrumentation. The computed expected Doppler shift is the basis of computed control signals which are coupled to the receiver operation and used to initialize or preset the latter, to greatly facilitate signal search and acquisition. This initializing or presetting is preferably accomplished through digital servo loops wherein the reference signals for sampling the received waves are generated, by phase-shifting such reference signals. These digital servo loops are also used after signal search and acquisition has been completed, i.e., during tracking operations, to continuously reset or update the reference signals which dictate and control the sampling operation.

---

This invention relates to a navigation instrument for use in radio navigation systems of the type generally known as Loran-C, and more particularly to an instrument of this nature having means for automatic Doppler compensation, for greatly facilitating the reception of the Loran signals.

Navigation systems of the kind typified by current Loran-C systems have been in use for some time. Basically, such systems include a complex of widely spaced radio transmitting stations which include a Master station, a Slave X station, a Slave Y station, and sometimes a Z and W Slave as well. The systems operate by transmitting very accurately time-spaced pulse groupings from each of the transmitters, which occur in Master-Slave X-Slave Y sequence once each pulse repetition period. Different transmitter complexes are identifiable from each other by the use of different pulse repetition periods, and also by different phase coding of the pulses in the pulse groups. These navigation systems are utilized by receiving the radio transmissions from a particular transmitting complex and measuring very accurately the time differences between reception of the Master pulse group and the Slave-X pulse group, and the Master pulse group and Slave-Y pulse group.

The locus of points of constant time-difference between the Master and each slave station defines two families of intersecting hyperbolic lines of position. Consequently, when a particular pair of time-differences have been measured, the position of the receiver becomes known relative to the hyperbolic frame of reference. This in itself is somewhat meaningless, however, until the position which has been fixed has been converted from the hyperbolic frame of reference to conventional orthogonal latitude and longitude coordinates. In the past, this conversion was performed by an individual person, and this required a specially trained receiver operator. Further, the conversion involved very tedious calculations plus the use of special charts, some of which provided the hyperbolic lines of position superimposed over the orthogonal grid. This was obviously a very time-consuming process, and it was also subject to error from many sources.

This method of navigation shows only the position occupied when the signals were received and the calculations initiated, of course, and this is likely to have been many minutes previous. Since it does not show what the actual present position is, the very great inherent accuracy of this ytpe of system was not fully utilized, and the system was actually practicable only for ships and for relatively slow-moving aircraft. Moreover, the radio receivers required to detect and track Loran-C signals have in the past been very large and complex, and commensurately very heavy, if of a quality which would preserve the inherent accuracy in the system. This factor has discouraged and restricted use of the system in aircraft.

Relatively recently, miniaturized and micro-circuited digital auto-track receivers have been developed which are not only comparatively accurate, but which are small, compact, and light-weight as well, and so are usable in many types of aircraft. Further, even more recently, a miniaturized airborne navigation computer has been developed by the assignee of the present invention which will automatically perform the conversion of the hyperbolic frame of reference time signals produced by the receiver into orthogonal latitude and longitude coordinates. The solution times of this computing equipment are very fast, and consequently the resulting orthogonal navigation information is updated regularly and constantly to provide in effect constant position fixes for the aircraft carrying the equipment. Since these fixes are obtained very rapidly, they closely approximate actual present position.

Although very greatly improved, the foregoing modern equipment is not without its own limitations. For example, the weight and size penalty of a separate receiver and a separate computer is significant. Further, the search and acquisition times required by present receivers is typically rather long, sometimes as much as fifteen minutes or longer. Since the Loran signals are completely "buried" in noise and continuous wave interference (signal-to-noise ratios being as great as minus fifteen db), detecting the Loran signals becomes a difficult task requiring substantial integration times.

The effect of this aspect upon presently-existing equipment has been to limit the effective range at which the Loran signals may be received and utilized to a distance significantly less than that which otherwise would be true if only the radiated power were taken into consideration. This is true since the effective range is determined in the main by the particular ambient noise and interference level, which determines the amount of integrating necessary to extract the signal from the noise. Further, presently existing equipment is not suitable for high performance aircraft, since at higher aircraft velocities the effect of a Doppler shift upon the Loran transmission becomes quite noticeable. At such high velocities, the Doppler effect acts to produce a significant shift in the frequency of the signals which are actually received, and this so changes the results obtained by present receiving techniques that in actuality a further limitation is placed upon the operation of the navigating equipment, both with respect to range and the limit of acceptable ambient noise and interference. Also, the received signals must be correlated after being detected in order to identify the different stations in a transmitting complex before the time differences between their respective signals can be measured, and all of these critical time-consuming aspects significantly hamper the search and acquisition of the signals by presently existing equipment.

Accordingly, it is a major objective of the present invention to provide a completely integrated electronic navigation instrument having a combination receiving and computing means with interdependent and time-shared operational components and elements, thus greatly reducing the size and weight requirements of the system and effecting commensurately great savings in manufacturing costs due to the elimination of a great many component assemblies, while at the same time greatly improving the ultimate operation of the instrument by increasing its inherent accuracy.

Another important object of the present invention is to provide an electronic navigation instrument having receiving and computing means for the purposes noted, which provides means for inserting preliminary information into the computing portion, where approximate or expected criteria for the search and reception of the Loran signals is computed and supplied to the receiving portion of the instrument to pre-set the same to facilitate and speed the search and the reception of the transmitted signals.

Still another object of the present invention is to provide a navigation instrument of the type noted which provides means for inserting approximate present position information into the computing portion and includes input means for continuously inserting present aircraft velocity information into the said computing portion, which then computes expected Doppler shift information from the position and velocity inputs and supplies the Doppler shift information to the receiving portion of the instrument to pre-set the same to facilitate and speed the initial reception of the transmitted signals.

A further object of the present invention is to provide a navigation instrument having the nature described, whose computing portion computes the expected Doppler shift with regard to each of the stations in the transmitting complex, and which automatically pre-sets its receiving portion to facilitate the reception of each of the transmitted signals.

A still further object of the present invention is to provide a navigating instrument of the type noted whose computing portion continuously computes present aircraft position from the radio signals received, and which further will compute Doppler shift information relating to the reception of signals from the transmitting complex from the computed position and from aircraft velocity information inserted thereinto, in order to facilitate the continued reception of such signals.

Another object of the present invention is to provide a navigating instrument of the type noted whose computing portion first computes expected Doppler shift information relating to the signals from the transmitting complex from approximate present position information inserted thereinto and from continuous aircraft velocity information similarly inserted, which further continuously computes present aircraft position from the radio signals which are subsequently received, and which will continuously and accurately measure Doppler shift information from the radio signals being received in order to facilitate both the initial reception of such signals and the continued reception of them once they have initially been received.

A still further object of the present invention is to provide a navigation instrument of the character described, whose computing portion includes memory apparatus, and which continuously stores the computed position information and computed velocity information in the said memory, such that in the event the reception of the actual signals is broken, the instrument may continue to provide Doppler shift information for pre-setting the receiving portion of the instrument, computed on the basis of the stored position and velocity information.

The foregoing objects and advantages of this invention, together with many additional and more specific attributes and features thereof, will become increasingly apparent to those skilled in the art to which the invention pertains following consideration of the ensuing specification and its appended claims, particularly when taken in conjunction with the accompanying drawings setting forth preferred embodiments of the invention. In the drawings:

FIG. 7 is a block diagram illustrating the preferred computer organization for the navigating instrument;

FIG. 8 is a symbolic diagram showing arithmetic unit logic;

FIG. 9 is a symbolic representation of arithmetic unit operation;

FIG. 13 is a diagrammatic illustration of the preferred temporary or "read-write" memory for the present system.

Figure 1:
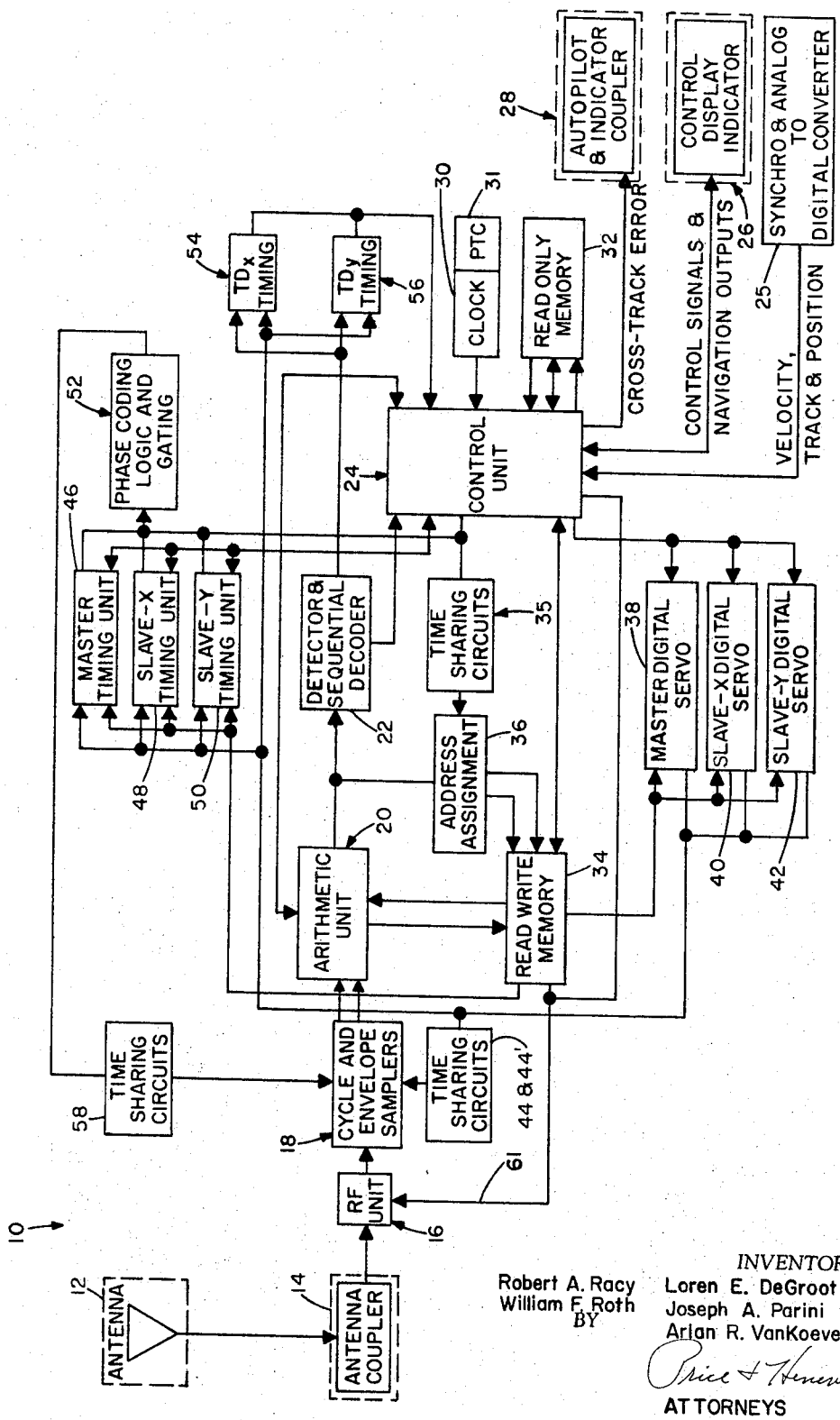
FIG. 1 is a schematic block diagram of the integrated navigation instrument, showing functionally distinguished component groupings.

Stated briefly, the present invention comprises a unitary, integrated electronic navigation instrument having combined receiving and computing means with interdependent operational components and elements. The instrument receives radio signals from a predetermined complex of transmitting stations, samples selected portions of these signals, integrates the signal samplings to maximize received power, correlates the integrated signal samplings to determine the identity of particular stations sending particular signals, determines the hyperbolic reference time-difference coordinates by comparing the sampled signals relative to each other, and automatically makes the computational conversion of the hyperbolic coordinates into more conventional orthogonal coordinates. This is preferably accomplished by a minimum of functional circuit component groupings which are time-shared with each other by a central control unit which sequences and times the various programs. The instrument further includes a control and display apparatus by which the orthogonal navigation information may be visibly displayed to the operator of the aircraft, and also by which information such as present position in latitude and longitude may be inserted back into the computer portion of the instrument to facilitate the initial search and acquisition of the signals from the transmitter complex. The instrument further includes an input means by which signals representative of the current aircraft velocity may be inserted into the computer portion. Initially, the computing portion acts upon the inserted position and velocity information to compute the anticipated Doppler shift with which the transmitted signals will be received at the aircraft, and the computed Doppler shift is used to initialize or pre-set the receiving portion of the instrument in order to greatly reduce the required signal search times. After the signals have been acquired by the instrument, the computing portion computes present position from the signals in the afore-mentioned manner, and then acts upon the computed position information together with the inserted velocity information to continuously compute the Doppler shift relating to each of the signals from the transmitter complex. This Doppler information is continuously supplied to the receiving portion of the instrument to Doppler-compensate its operation in order to facilitate the continued reception of the signals. Further, the computing portion of the instrument includes memory apparatus, and the computed position information together with computed velocity information is continuously stored in this memory, so that in the event the actual transmitter signals are lost or transmission is otherwise broken, the computing portion may act upon the stored values of position and velocity to compute approximated Doppler shift information, with which the receiving portion is then compensated.

The present application is a companion to copending application Ser. No. 454,033 filed May 7, 1965, which sets forth the basic structure and operation of the navigation instrument in great detail, together with a detailed explanation of certain specific features which will merely be noted in the present case.

Referring now in more detail to the inventive navigation instrument, and to the most typical system in which to use the same, certain salient characteristics of Loran-C radio transmissions will first be set forth, since these in some measure indicate and define operational capabilities which particular component groupings of the instrument must possess.

Loran-C is a pulse-coded system which operates at a carrier frequency of one hundred kc. plus or minus ten kc., with a bandwidth at the three db point of seven to eight kc. The Master and each of the Slave stations transmit a coherent group of amplitude-modulated pulses having a pulse length of three hundred micro-seconds, and spaced one thousand micro-seconds apart. There are eight pulses in each Slave pulse group and nine pulses in the Master pulse group, the ninth such pulse being spaced approximately thirteen hundred micro-seconds from the eighth. The pulse repetition period (PRP) in which each of the stations sequentially transmits its pulse group varies between different Loran station complexes from one hundred thousand micro-seconds to twenty nine thousand micro seconds. The radiated peak power is from two hundred and fifty to five hundred kw., and the radiated power at the sample point (which is between twenty-five and thirty microseconds after the beginning of each pulse) is approximately sixty to seventy-five kw. This gives the system a range on the order of two thousand nautical miles.

The multiple pulses in each pulse group are intended to raise the average transmitted power, and the pulses in each group are phase-coded in two established code groupings which alternate between successive PRPs. This coding provides a way to discriminate between the Master and the Slave stations, and also a way to discriminate against ground-wave or sky-wave signals. The hyperbolic frame of reference time-difference which have been noted previously are a measure of the relative times of reception between the Master pulse group and those of the different Slave stations, and these are measured in microseconds. As has already been stated, the signal-to-noise ratio of the Loran transmission may be as great as minus fifteen db, and the received power level may vary by as much as one hundred db.

In the schematic block diagram of FIG. 1, the navigation instrument 10 is illustrated as composed of functionally distinguishable component groupings, all of which are appropriately labeled for clarity. It will be seen that the preferred integrated instrument 10 makes use of an antenna 12 for receiving the Loran carrier signal, and an antenna coupler 14 for matching the impedance of the antenna to that of an RF tuning unit 16 within the instrument 10, in accordance with familiar design techniques.

The RF unit is coupled to a cycle and envelope sampler section 18, which in turn is coupled to an arithmetic computing unit 20. The arithmetic unit is coupled to a detector and sequential decoder 22, which in turn connects to a control unit 24, which acts to sequence and time the various receiver functions and computer programs, as will subsequently be explained further. The control unit 24 is coupled to an externally-located control-display indicator 26, by which the outputs from the integrated instrument 10 may be visibly displayed to the operator of the aircraft, and also by which the operator may insert information into the instrument, as will be explained. Further, it will be noted that the control unit 24 may be coupled to an autopilot and indicator coupled 28, by which outputs from the navigation instrument 10 may be used in conjunction with various external aircraft control systems. Also, a synchro and analog-to-digital converter 25 of a known type is preferably utilized to insert externally-generated aircraft system outputs into the control unit 24, including aircraft velocity information for example.

It is to be noted that the integrated instrument 10 includes a digital clock apparatus 30 (preferably a crystal clock) which is connected to operate into the control unit 24. The instrument further includes both a permanent or "read only" memory unit 32 and a temporary or "read-write" memory unit 34, which are connected to operate both into and out of the control unit 24. It will be observed that an address-assignment unit 36 couples the arithmetic unit 20 and the detector and sequential decoder 22 to the read-write memory 34, and is itself coupled to the control unit 24 through time-sharing circuitry 35. It will be appreciated that actual embodiments of the memory units 32 and 34, as well as the address-assignment unit 36 and the arthmetic 20, may provide these units in combinations and groupings that are superficially different than those shown here, but which operate identically.

The instrument 10 further includes digital servo means 38, 40, and 42 for respective operation in conjunction with the Master, Slave X, and Slave Y pulse groupings. These servo means interconnect the control unit 24 and the read-write memory 34, and provide an output that is coupled to the sampler means 18 through time-sharing circuitry 44 and 44'. The servos are also coupled to Master, Slave X, and Slave Y timing units 46, 48, and 50, respectively.

The timing units 46, 48, and 50 are each coupled to receive signals from the control unit 24, and each of the timing units is connected to supply an output to a phase-coding logic and gating network 52. This output is also connected to the control unit 24. Further, all of the timing units are coupled to the read-write memory 34 to receive signals from it. The instrument also includes a pair of time-difference measuring units 54 and 56 which receive the servo means outputs and measure the time differences between the Master and Slave X and Y pulse groupings (TDx and TDy, respectively). Each of the time-difference measuring units 54 and 56 are interconnected, and they are also coupled to the control unit 24. Further, the phase-coding logic and gating network 52 is coupled back to the cycle and envelope samplers 18, through time-sharing circuitry 58, as will be explained. Finally, the control unit 24 is coupled directly to the RF tuning unit 16, as is the read-write memory 34.

As has already been stated, the integrated navigation instrument 10 is concerned primarily with: the detection and identification of Loran-C navigation signals in the presence of noise; the measurement of the difference in the times of reception of signals from the Master and Slave transmitters; the conversion of these time-difference signals into orthogonal (geodetic) latitude and longitude coordinates; and, if so desired, the computation of a variety of steering and other navigating information with respect to some preselected destination. The latter may include such as range and bearing angle to the destination, ground speed, track angle, cross-track error, and the like, which all may be computed once the correct geodetic position coordinates are provided and a selected destination is inserted into the unit. While the nature of some of the functional component groupings noted in connection with FIG. 1 will be clearly apparent once the underlying operation of the instrument and the connections shown in FIG. 1 are considered, certain of the more important and unique functional groupings will next be described in more detail, and a detailed description of the operation will also be given, from which the implementation of the device will become altogether clear.

Figure 2:
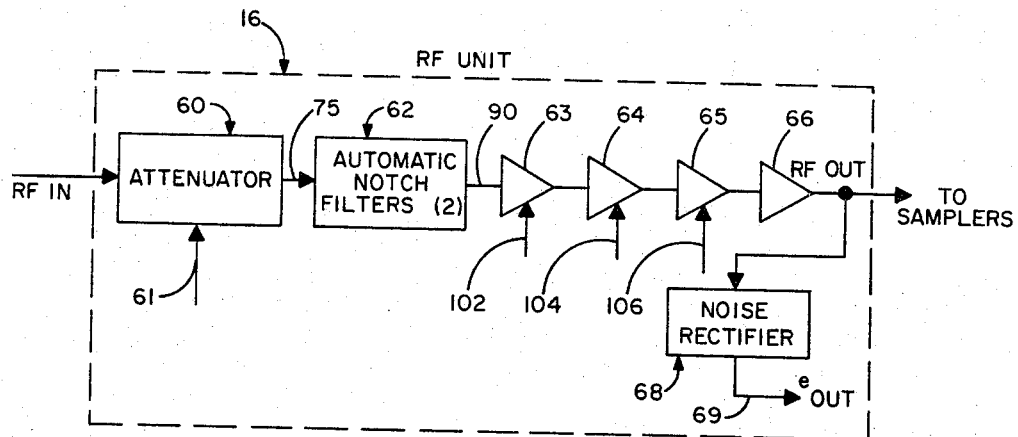
FIG. 2 is a schematic block diagram of the RF unit of the instrument.

The RF unit 16 is shown in more detail in the schematic block diagram of FIG. 2. It will here be seen that this unit is comprised of a number of sub-units, including a variable or switchable attenuator means 60 having an attenuating and a non-attenuating operating condition controlled by the presence or absence, respectively, of an input indicated at 61. The RF unit further includes automatic notch filters 62 (by which continuous-wave interference closely surrounding the Loran carrier signal may be filtered out), four stages of RF amplification designated 63 through 66 inclusive, and a noise rectifier 68 having an output at conductor 69 that is proportionate to the level of the ambient noise being received with the Loran signals. A complete and specific description of the circuitry which forms the RF unit 16 is set forth in the above-identified copending U.S. patent application Ser. No. 454,033, to which reference is now made. The operation of each of the component groupings in the RF unit is also set forth there, together with a description of the novel manner in which the computer portion of the navigation instrument presets attenuation and AGC in accordance with computed parameters based upon the maximum expected strength of the signals to be received, which is also computed. The said copending application also points out the bandwidth modulation feature of the RF amplifying section, by which amplifier bandwith is determined by the mode of operation of the system and the ambient noise level of the operating service area.

Figure 3:
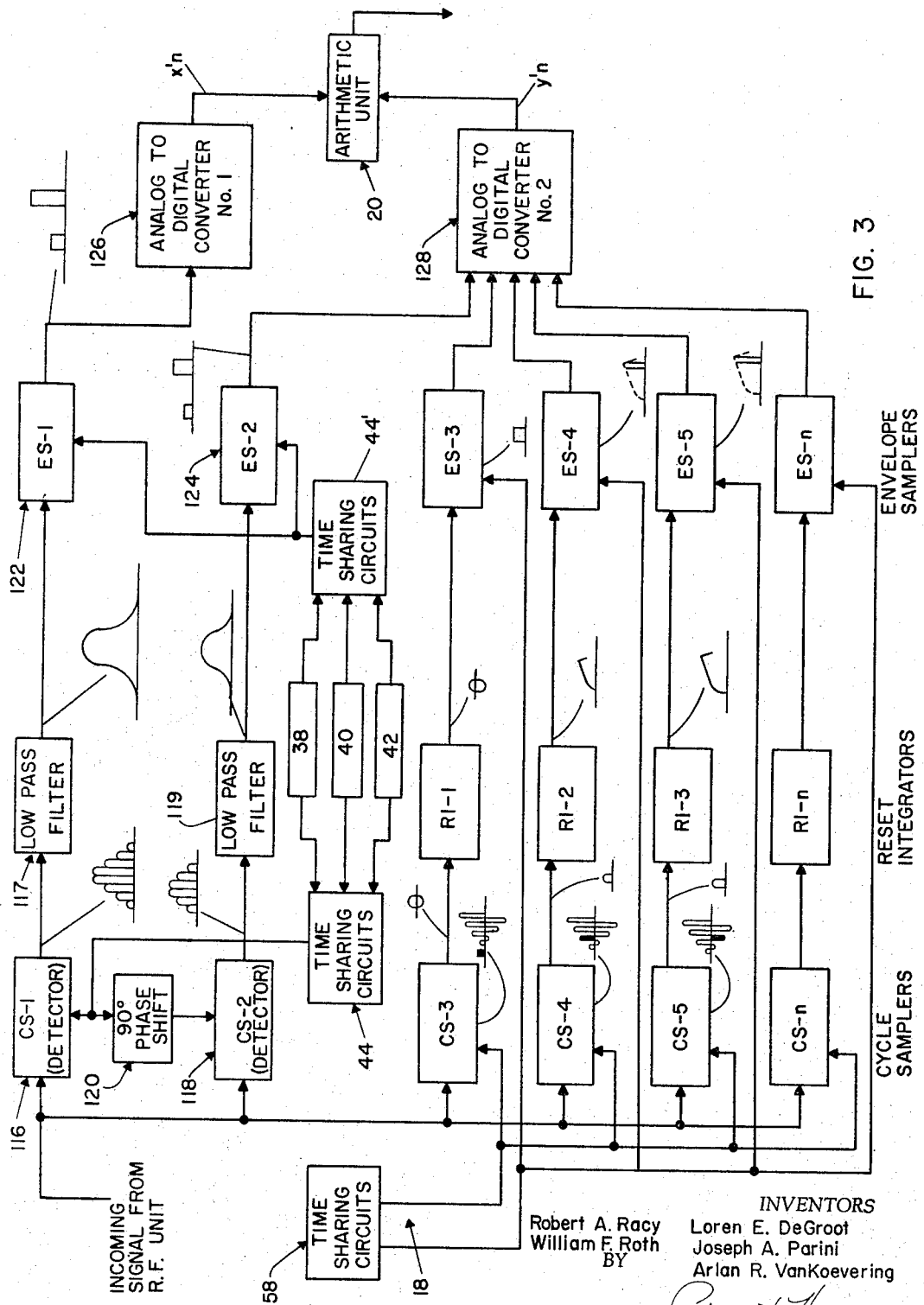
FIG. 3 is a schematic block diagram of the complete sampler unit shown in FIG. 1.

As is shown in FIG. 1 and noted in connection with the discussion thereof, signals from the RF unit 16 pass into sampling circuitry 18. The over-all nature of the sampling circuitry is illustrated in FIG. 3, which shows the composite circuit in block form and includes wave diagrams to illustrate circuit performance. As is set forth in detail in the above-mentioned copending application, the samplers themselves are preferably synchronous detectors of the type illustrated therein. As seen in FIG. 3, the sampler circuitry includes a battery of individual cycle samplers such as 116 and 118 (CS for convenience), which feed into either low-pass filters such as 117 and 119 or reset integrators (RI(1), RI(2), etc.), and a like battery of envelope samplers such as 122 and 124 (ES for convenience), which are connected to the output of the filters 117 and 119 and the reset integrators. The envelope samplers provide an output to analog-to-digital converting means such as 126 and 128, which in turn are coupled to the arithmetic unit 20 noted previously.

More specifically, the sampler unit 18 includes a first pair of cycle samplers 116 and 118 which receive and sample the incoming signals from the RF unit 17 in accordance with an internally-generated reference signal which determines the sampling rate and time. An individual reference signal is provided for sampling the pulse grouping from each station in each Loran PRP. As will subsequently be described in greater detail, the individual references are generated in the digital servo means 38, 40, and 42, noted in connection with FIG. 1. The individual references are supplied initially to the time-sharing matrices 44 and 44'. Matrix 44 gates the reference signals from each servo means in sequential order to the cycle samplers 116 and 118. It will be noted, however, that before the sequentially-gated references are supplied to sampler 118, they are shifted in phase by ninety degrees by passing through an appropriate phase-shift matrix 120.

As will be subsequently explained, the navigation instrument must initially search for and acquire the Loran signal by locating the pulse groupings from each transmitting station precisely within each pulse repetition period. Accordingly, the reference signals applied to the cycle samplers 116 and 118 are not initially expected to be in full synchronization with the Loran signal pulses. The samplers themselves are merely synchronous detectors which, as is known, produce a maximum positive output when strobed directly in phase with the signal to be sampled, produce a maximum negative output when they are strobed one hundred eighty degrees out of phase, and produce zero output when strobed either ninety degrees or two hundred and seventy degrees out of phase with the signals to be sampled. Consequently, the ninety degree phase shift introduced by matrix 120 insures that at least one of the samplers 116 or 118 will always produce at least some output. This aspect is illustrated by the wave forms shown in FIG. 3 at the output of the samplers, which indicate that sampler 116 is only slightly out of phase with the Loran signals, while sampler 118 is nearly ninety degrees out of phase therewith.

The outputs of samplers 116 and 118 are fed through low pass filters 117 and 119, respectively, which generate the envelope of the sampled signal, as illustrated in FIG. 3. The filter output is passed into a pair of envelope samplers 122 and 124 which sample the same in a manner very similar to that of the cycle samplers 116 and 118, except that the strobing reference signal controlling the envelope samplers is gated through time-sharing circuitry 44' rather than the similar matrix 44. In effect, matrix 44' serves to decrease the sampling rate by a factor of twenty. Basically, this approach utilizes preferred statistical techniques to reduce the great number of samples presented to the remainder of the instrument. That is, the rate of the reference pulses provided by the servo means 38, 40, and 42 and gated through time-sharing circuitry 44 is one hundred kc., the same as that of the Loran carrier signal. This produces one sample from the cycle samplers every five micro-seconds. This would require an enormous memory capacity in the system. This requirement is greatly reduced by driving the envelope samplers 122 and 124 at the reduced rate of ten kc. in the manner noted, to effect a reduction in the number of samples by a factor of twenty.

It is desired that the samples finally produced by the composite sampling apparatus be correlated with stored ideal references, and consequently the outputs from envelope samplers 122 and 124 are supplied to suitable analog-to-digital converting means, designated 126 and 128, where the pulses are given an appropriate digital number. Since the samples were taken ninety degrees apart, the digitized outputs from the converters 126 and 128 represent the X and Y component vectors of the signal (designated $X'_n$ and $Y'_n$ respectively). These component vectors are resolved or summed in order to determine the RMS vector length and angle. This takes place in the arithmetic unit 20.

The remaining portion of the sampler means 18 of FIG. 3 consists of a battery of similar cycle samplers which are designated CS(3), CS(4), CS(5), and, to illustrate that the exact number thereof is variable to suit particular circumstances, CS($n$). These cycle samplers receive the incoming Loran signal in the same manner as cycle samplers 116 and 118, discussed previously, but their strobing reference signals are supplied from time-sharing circuit matrix 58, and not from the time-sharing circuitry 44 or 44'. The reference signals to cycle samplers CS(3), CS(4), and the like are gated by the time-sharing matrix 58, to strobe these samplers in the manner indicated by the associated wave forms, from which it will be seen that each of the samplers samples a different portion of the Loran signal pulse. The resulting samples are summed over a period of time by the reset integrators RI(1), RI(2), RI(3), and RI(n), respectively, to produce the waveform illustrated in connection with each.

The integrated signals are supplied next to the envelope samplers ES(3), ES(4), ES(5) and ES(n), respectively, where they undergo a sampling process generally equivalent to that described in connection with samplers 122 and 124. The reference pulses for ES(3), ES(4), etc. are also provided by the time-sharing circuit 58, however, and not by time-sharing circuitry 44', as it true for envelope samplers 122 and 124. The reference signals for ES(3), etc. occur at the diminished rate previously described, so that this group of samplers produces proportionately fewer samples than cycle samplers CS(1), etc. The outputs from envelope samplers ES(3), etc. are supplied to analog-to-digital converting means 128, which assigns a digital value to the envelope samples. These are then coupled to the arithmetic unit 20 for computation purposes, as will subsequently be explained in greater detail.

Cycle samplers CS(3), CS(4), CS(5), etc. are used for different modes of operation than are the similar samplers 116 and 118; more specifically, the latter two samplers are used in the Rough Search operation, whereas the former battery of samplers are used in the Fine Search and Tracking modes, wherein hyperbolic time-difference coordinates are measured and converted into orthogonal reference coordinates.

Figure 4:
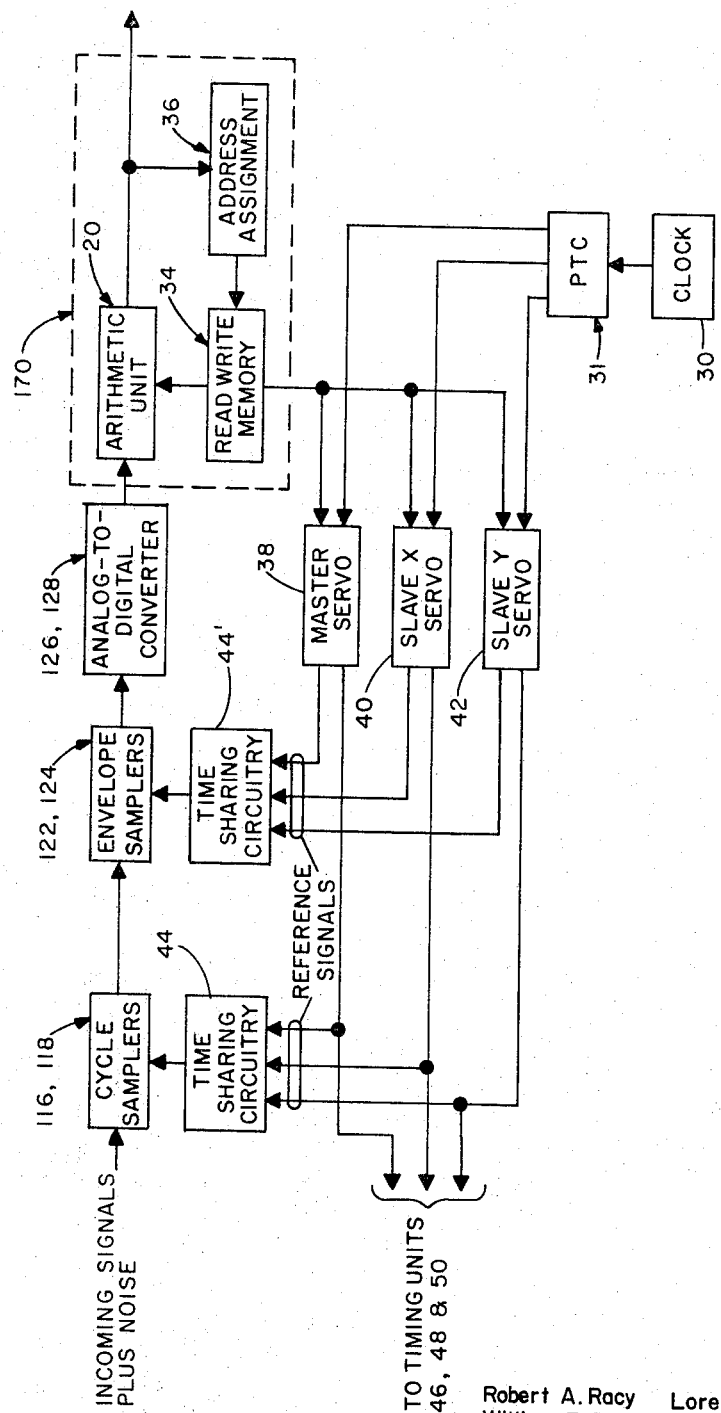
FIG. 4 is a schematic block representation of the digital servo loops utilized in the instrument, together with other component groupings which operate in concert therewith.

The three digital servo means 38, 40, and 42 noted in connection with FIG. 1 are further illustrated in the schematic block representation of FIG. 4, together with associated component groupings of the navigation instrument with which they function. As seen in this figure, each of the three servo means supplies outputs which in one instance are coupled to the time-sharing circuit matrix 44 which sequentially gates references from each of the three servo means to the cycle samplers 116 and 118, (discussed previously in connection with FIG. 3). These same reference signals are also coupled to the timing units 46, 48, and 50. In the second instance, the three servo means supply outputs to the time-sharing circuit matrix 44', which sequentially gates these references to the envelope samplers 122 and 124, as was also seen in connection with FIG. 3. As will be observed from FIG. 4, the digital clock 30 is coupled to the central pulse train counter (PTC) 31 of the instrument, and the latter is connected to each of the three servo means 38, 40, and 42. Further, each of the three servo means is connected to the read-write memory 34. As will subsequently be seen in greater detail, in the operation of the three digital servo loops which have been described, the arithmetic unit 20, the read-write memory 34, and the address-assignment unit 36 all function together to provide a first intergrating means, which is designated 170. As will be seen, the integrating means 170 is time-shared to operate in conjunction with each of the three servos 38, 40, and 42 through their connection with the read-write memory.

Figure 5:
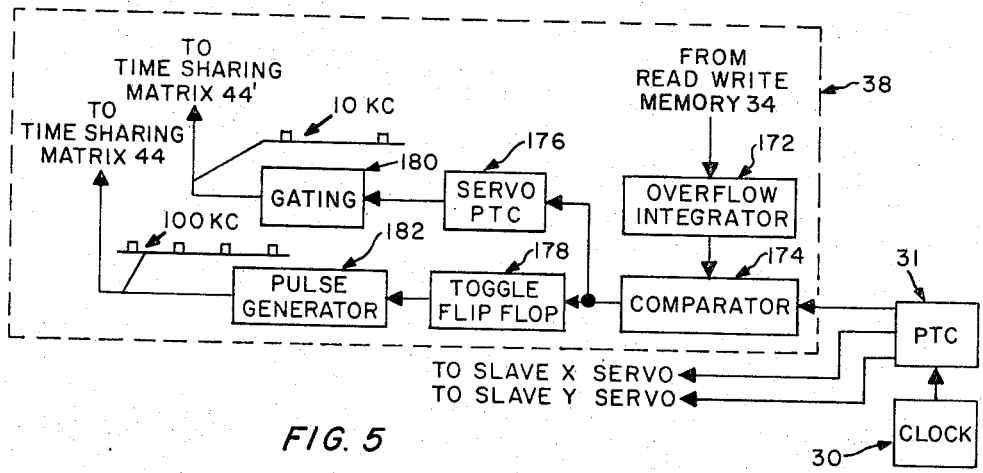
FIG. 5 is a detailed schematic block diagram of a representative digital servo used in the servo loops of FIG. 4.

The master digital servo means 38 of FIGS. 1 and 4 is shown in more detail in FIG. 5. Since each of the three servos 38, 40 and 42 are identical, it will be understood that the description of master servo means 38 is exemplary of each of the three. As is illustrated in both FIGS. 4 and 5, each of the three servo means comprises a Type II zero velocity error phase-tracking servo. In addition to the first integrating means 170 seen in FIG. 4, each servo includes an overflow integrator 172 which is connected to the read-write memory 34 of the first integrator 170, and a comparator 174 coupled to the overflow integrator and to the pulse train counter 31 and digital clock 30. The comparator 174 provides an output to an internal servo pulse train counter 176 and a toggle flip-flop 178. The servo pulse train counter is coupled through appropriate gating 180 to the time-sharing matrix 44', as is also illustrated in FIG. 4. The toggle flip-flop 178 operates a pulse generating means 182 which produces the one hundred kc. reference pulse train coupled to time-sharing matrix 44 and to the timing units 46, 48, and 50 (note FIG. 4).

The three digital servo loops provided by the three servo means 38, 40, and 42 are for the purpose of initially generating the reference pulse train which is used to strobe the sampling means, and also to provide a way of effecting compensation for the Doppler shift with which the Loran signals will be received at particular positions and aircraft velocities. More specifically, it has been seen in connection with FIG. 1 that the operator of the aircraft may initially utilize the control display indicator 26 to insert present position information into the instrument. Further, aircraft velocity is continuously supplied to the instrument through the synchro and analog-to-digital converter 25. The computer organization of the instrument utilizes these inputs, together with appropriate memory storage, to compute the expected or anticipated Doppler shift with respect to each transmitting station in the particular Loran complex involved. The effect of the Doppler shift will be to produce a phase error between the internally generated reference signals operating the sampling means and the incoming Loran signals. Since such a phase error is not known and cannot be measured until search and acquisition of the Loran signals is completed, the input to the first integrating means 170 is zero, but the output of this integrator represents the computed initial Doppler shift. Compensation for this shift is accomplished by a timing signal to the overflow integrator 172, which controls the point at which the comparator 174 will gate a signal to the servo pulse train counter 176 and the toggle flip-flop 178.

Figure 6:
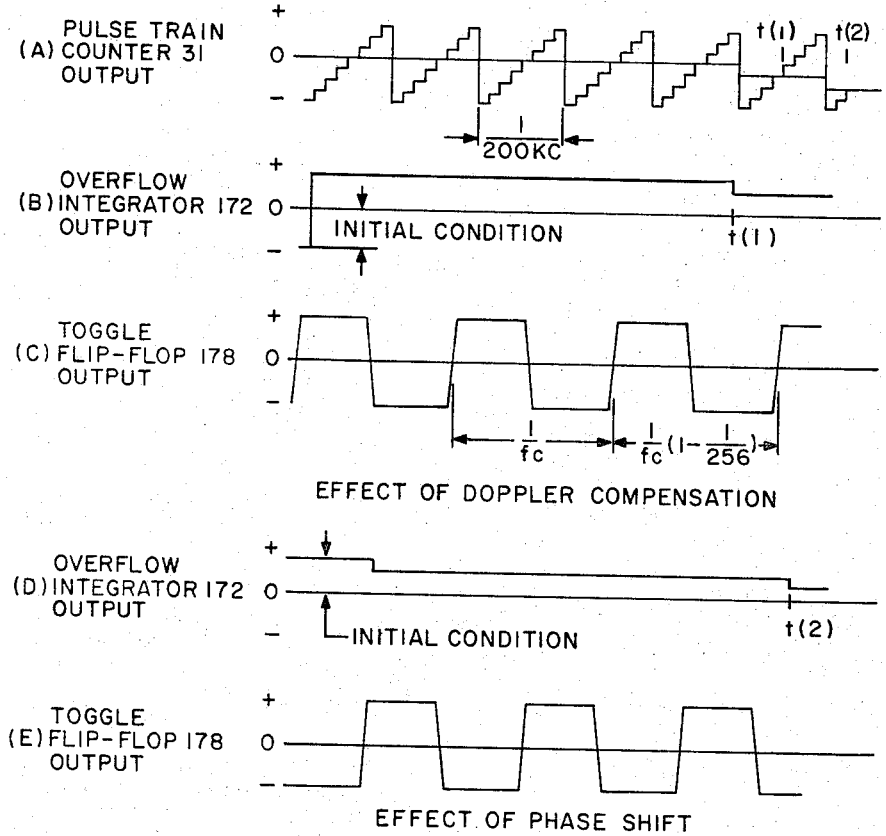
FIG. 6 is a graphical diagrammatic presentation showing features of the operation of the servo loops of FIG. 4.

The operation of the Doppler-compensating servo means 38 is further illustrated in FIG. 6. Here, the output of the pulse train counter 31 is seen at (A) cycling every two hundred kc. to provide an effective output at the toggle flip-flop of one hundred kc. The computed Doppler shift information is presented to the overflow integrator in the form of a timing signal, shown as the "initial condition" in FIG. 6. (See FIG. 6 (B).) If at some time $t(1)$ the first integrating means 170 provides a different timing signal to the overflow integrator representative of a different Doppler shift, the effect will be to trigger the toggle flip-flop 172 at a slightly different point in the cycle of the pulse train counter 31 (compare FIG. 6(A), (B), and (C) at time $t(1)$). This will produce a slight shortening of the first recycle period of the PTC which acts to adjust the phase of the reference signal (see FIG. 6(C)) by shifting the reference train slightly to the left on the time axis. In this manner, the average frequency of the reference train is changed slightly to reflect the desired Doppler shift. A second instance of this Doppler compensation is shown in FIG. 6 at (D) and (E) at time $t(2)$.

From the foregoing, it will be apparent that the digital servo loops which have been described act in concert with the computer organization and its components forming the first integrating means 170 to Doppler-compensate the internally generated reference signals which strobe the samplers. Initially, this compensation is based upon computed values, so that the servos operate in an open-loop condition during rough search. However, after the Loran signals have been acquired, the phase error between the reference signals and the received signals is continuously measured and used to close the servo loops so that they operate to track the received signals. That is, whenever the measured phase error exceeds approximately 0.7 degree, the first integrating means 170 provides a timing signal to the overflow integrator 172 which effects Doppler correction in the foregoing manner, by either incrementing or decrementing the least significant bit (LSB) of the overflow integrator 172, depending upon whether the Doppler shift is plus or minus. (Note FIG. 6 (C).)

The output of the overflow integrator ranges between the same plus and minus valves as the PTC, and the modulus of the overflow integrator is equal to the modulus of the PTC. Therefore, the output of the comparator 174 is at the same frequency as the PTC, and the output of the toggle flip-flop 178 is at one half the frequency of the PTC. By using a modulus 256 PTC and a 51.2 megacycle clock, it can easily be seen that the output of the toggle flip-flop will be at a nominal frequency of one hundred kc., the same as the Loran-C signal. This clock frequency also provides the basic resolution of 0.7 degree, or 0.02 microsecond. Since the digital servos are operated open-loop during the Rough Search mode, the servo time constant can be small. The pulse generator 182 is used to vary the width of the reference pulses during Fine Search and Tracking modes, in order to obtain an additional signal-to-noise improvement at the expense of some loss in signal energy.

As will be noted from examining FIG. 5, the reference signals provided to time-sharing matrices 44 and 44' are both Doppler-compensated, and consequently both the cycle samplers and the envelope samplers will be compensated for Doppler effects, both initially under computed conditions and continuously under measured conditions. Further, since the read-write memory 34 is constantly involved in the operation of the computer organization and the first integrating means 170, it will be apparent that both the computed orthogonal position information and velocity information will continuously be stored and will be available to the Doppler-compensating circuitry in the event that the Loran signals are lost, or transmission is somehow interrupted. Under these circumstances, the computer organization will continue to compute an approximated Doppler compensation which will be utilized by the digital servos to continuously adjust the average frequency of the internally-generated reference signals.

It will be recognized that many of the component groupings utilized in the present invention navigation instrument are entirely within the capabilities of one having ordinary skill in this art, and consequently no specific detailed discussion of such is deemed to be necessary here. For example, the analog-to-digital converters such as 126 and 128 of the sampling means 18 will be recognized as being implemented by such as an accurate clock signal gated into a pulse train counter under the control of a comparator circuit having the analog signals as an input. The analog low-pass filters 117 and 119 of the sampling means is basically a first-order filtering device which requires only resistive and capacitive elements in familiar configuration. However, it should be noted that digital filtering may be implemented by use of components as an adder-subtractor, read-write memory, and a serial multiplier. All of these units are available within the arithmetic unit 20, and they can be time-shared as needed, thereby dispensing with the requirement of any separate individual filter networks. Indeed, the practice of time-sharing the different component groupings is carried on throughout the integrated navigation instrument whenever possible, so that the instrument may accurately be described as having "central" component groupings which are time-shared in a variety of different ways.

Figure 10:
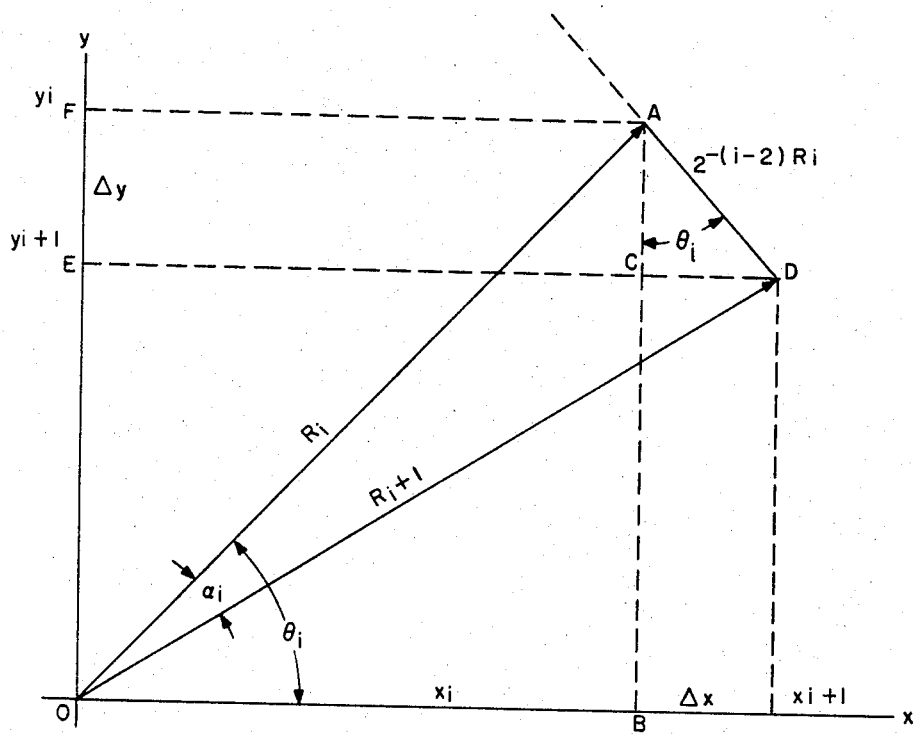
FIG. 10 is a vector diagram, including exemplary equations, of the principle operation of the arithmetic unit.

The preferred computer organization for utilization in the present navigation instrument is illustrated in the block diagram of FIG. 7. This organization defines a modified general purpose (GP) machine organization, which provides the necessary functions already related and those to be subsequently described, while allowing a maximum time-sharing of digital hardware. It incorporates a stored program in addition to a typical computer buss word transfer system, but also includes a special arithmetic unit 20, core rope permanent ("read only") memory 32, and a multiple transfer buss system, which act with the GP machine structure to yield a faster and more reliable system. Although the nature of the units involved in the computer organization will be clear to those skilled in the art, certain of these are illustrated by specific figures in order to further clarify and fulfill the description thereof. Thus, the logic performed by the arithmetic unit 20 is illustrated symbolically in FIG. 8, and a symbolic representation of the operation of this unit is shown in FIG. 9. Further, exemplary equations and the vector diagrams thereof are fully illustrated in FIG. 10. An arithmetic unit developed along these principles will perform most trigometric computations in no more time than is required for a simple multiplication. In addition to simple sines, co-sines, arc sines, arc co-sines, etc., the arithmetic unit is to be specifically capable of solving coordinate rotation and resolution equations, and also is to perform multiplication, division, square root, conversion from binary to binary-coded-decimal, and the converse.

Figure 11:
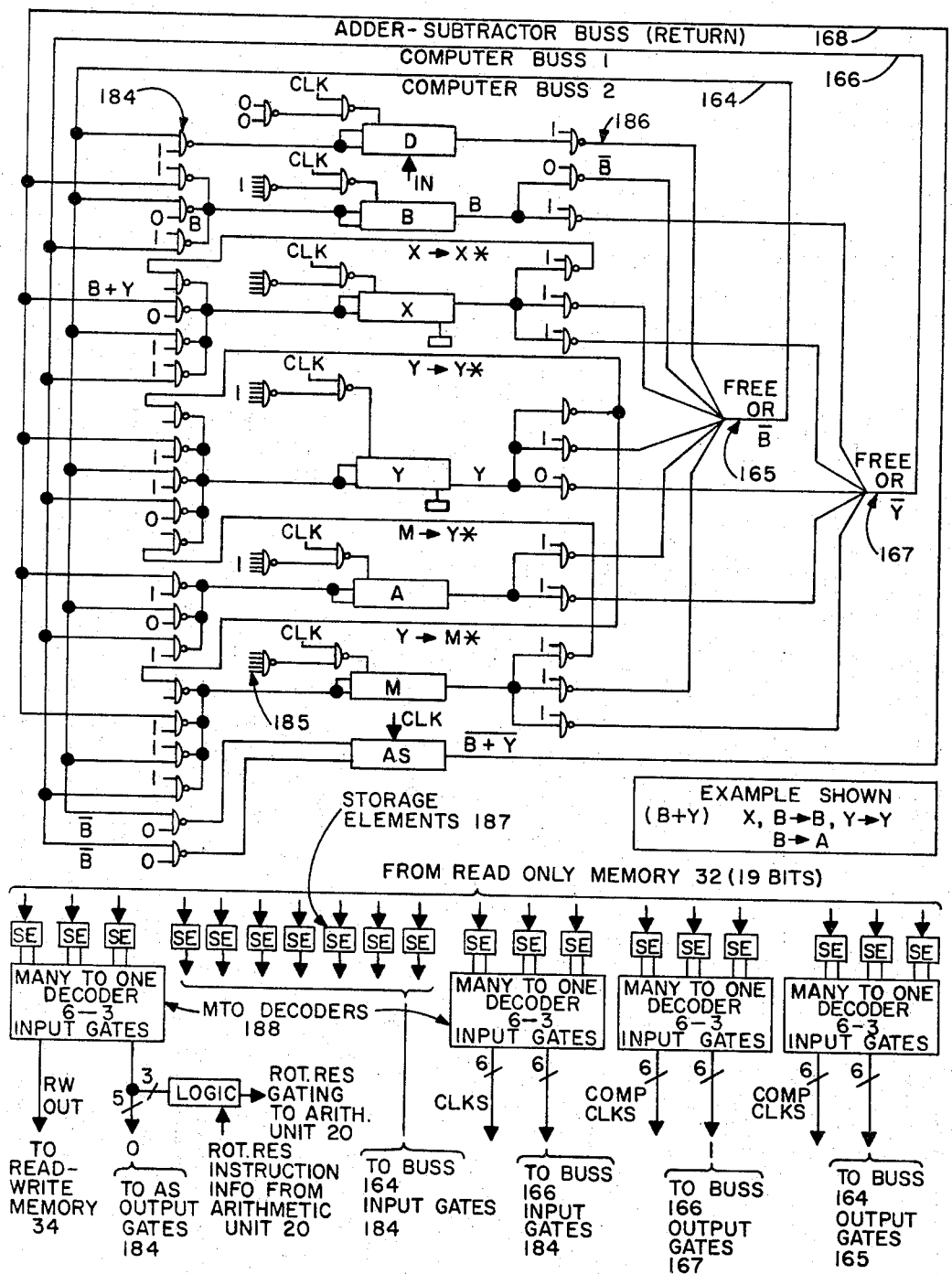
FIG. 11 is a schematic diagram showing the transfer system of the preferred computer organization.

In addition to the high speed arithmetic unit just noted, a multiple word transfer system is used. As opposed to typical GP machine structure that generally has single word transfer, the present computer organization is to include the feature of transferring many words simultaneously during a single program step. This naturally increases machine speed and reduces the number of program steps required. Such a transfer system is depicted diagrammatically in FIG. 11, which illustrates digital word transfer from one register (labeled B, X, Y, etc.) to another by means of a multiple computer buss system. By having one complete buss 164 it is possible to transfer a word in any one register to any or all the other registers, including the adder-substractor unit (AS). In this connection, it will be noted by comparing FIGS. 8 and 11 that the adder-subtractor portion may actually be mechanized by utilizing from one to three individual registers, depending upon the solution times it is desired to obtain. At the same time, the transfer from a register can be either destructive (non-cyclic) or non-destructive (cyclic). Additionally, another buss system 166 having less flexibility in that only a capability of transferring (either destructively or non-destructively) from any one register to any one single register is also incorporated. Further, an adder-subtractor buss 168 is used to gate the output of the adder-subtractor (AS) to any of the computational registers, designated B, X, Y, A, and M. Finally, the various gating functions involved in the transfer operations herein described are provided by the batteries of "NOR" gates 184, 185 and 186, and the "FREE-OR" gates 165 and 167, whose multiple gating operations clearly appear from the figure and the example shown therein for the function $(\overline{B+Y})$ and need not be unduly elaborated. As the figure shows, the inputs to these gates originate in the read only memory 32, and they are coupled to the gates through the battery of "Storage Elements" 187 (which may be flip-flops) and the battery of many-to-one decoders 188, which as indicated may include six three-input gates and consequently will each have six outputs which are appropriately labeled. The gating of the central system clock 30 (abbreviated "CLK" in the figure) is determined by the gates 185, which determine the number of bits shifted in or out. The particular gates shown are of the "NOR" variety, although it will be understood that other conventional gating systems may be employed if desired.

The computer organization for the present navigational instrument has a requirement for both permanent (read only) and temporary (read-write) memories, as are depicted in FIGS. 1 and 7 by units 32 and 34, respectively. The permanent memory is required for system and computation constants, for the program to be followed, and for storing the gating functions required to control the various transfers just described. The temporary or read-write memory provides storage for intermediate results as the navigation computations progress through each cycle. Although it is possible to use the same physical device to satisfy both permanent and temporary requirements, there are advantages in having two memories, which are suited to peculiar requirements. Such advantages include a reduction in electronics by eliminating "write" circuitry in the permanent memory, and a truly permanent memory in which the information content is unalterably fixed by construction. In the present system, both types of memory may have the same size, requiring a capacity of 1,024 words.

Figure 12:
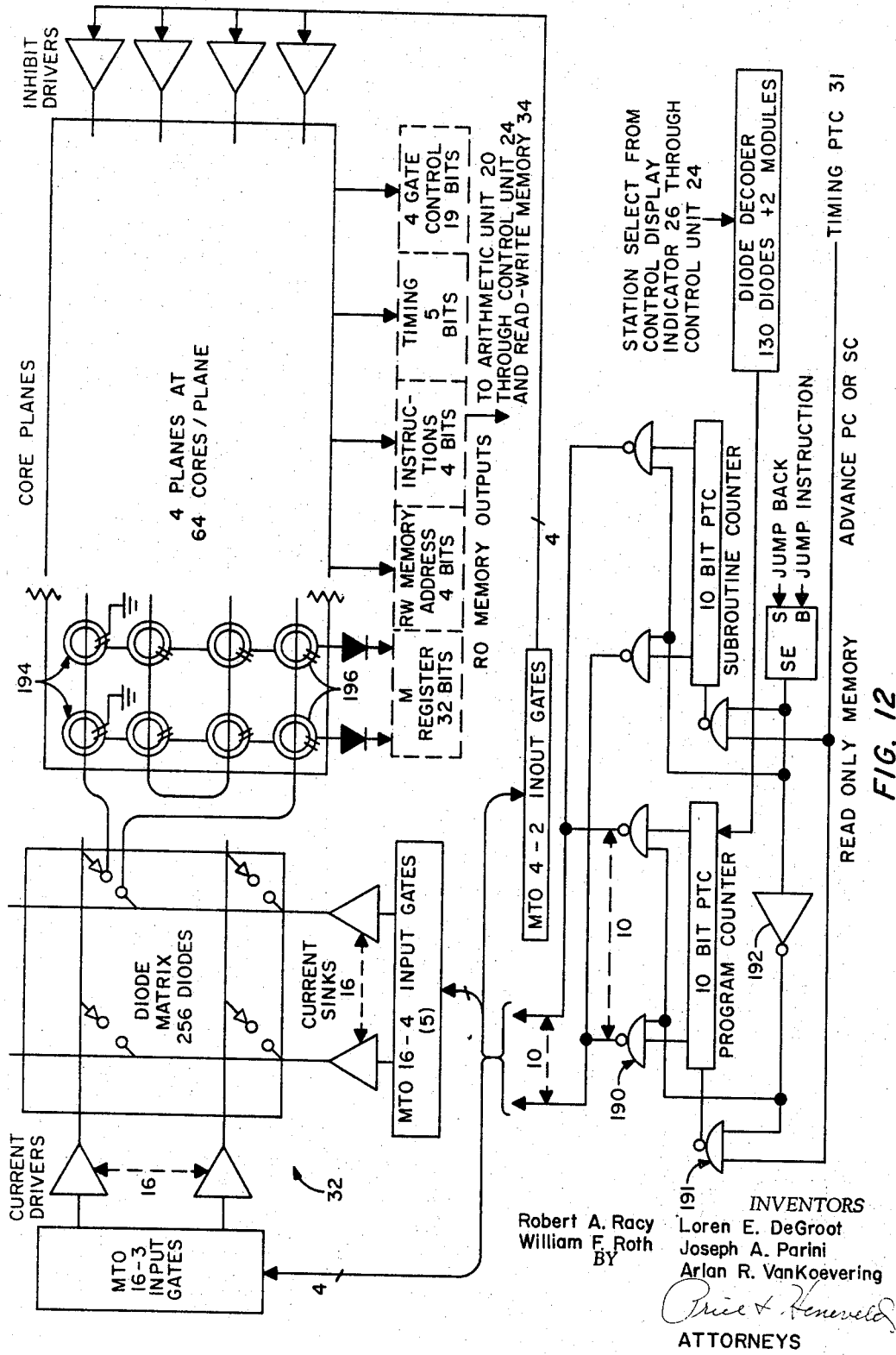
FIG. 12 is a diagrammatic illustration of the preferred permanent or "read only" memory utilized in this system.

A preferred form of permanent memory is diagrammatically illustrated in FIG. 12. This is a core rope memory unit, which has the advantages of non-volatility and high reliability, and yet provides for relatively easy changing of its content by restringing wires in the core planes without modification to any electronic portion of the memory. It is contemplated that the labeling in this and other comparable figures will more than adequately identify the various components and component groupings contained therein. However, in FIG. 12 the NOR logic gates are designated 190 and 191 and the signal inversion means designated 192. Further, the donut-shaped memory cores are designated 194, and their sense windings designated 196.

As for the temporary storage unit, this is diagrammatically illustrated in FIG. 13. This unit is of the conventional coincident current ferrite type, having a cycle time of 10 micro-seconds. A storage of 1,024 words of 32 bits each is caintained in 32 planes of 32 x 32 cores per plane. The core material is lithium ferrite, so that a wide temperature range of operation is possible. The electronics operating the temporary memory are mainly of the integrated semi-conductor form, including all many-to-one (MTO) decoders, sense amplifiers, and timing unit. Once again, it is expected that those skilled in the art will fully understand the nature of the various units upon examining FIG. 7 and upon becoming familiar with the nature of the operation of the navigational instrument, and consequently the matter illustrated in such figures as 12 and 13 does not require further elaboration.

The previous remarks relating to the state of the art in connection with the analog-to-digital converters, digital filters, etc. are also true of the control unit 24, which has been noted in connection with FIG. 1 and which is illustrated in FIG. 7. In this figure it is seen that the control unit is comprised of the required priority circuits and timing circuits for properly performing the various programs. As will be understood, this unit provides the required timing and control signals for the navigation instrument, such that the various modes of operation are sequenced in a logical order with due regard to the real time signal-receiving functions. The control unit 24 embodies digital control techniques.

The specific nature of the timing units 46, 48 and 50 which are depicted in FIG. 1 and noted in connection therewith is described in our previously identified copending patent application Ser. No. 454,033, which sets forth the operation of these units in considerable detail. For the purposes of the present application, it is sufficient to note that from FIGS. 1 and 4 it will be understood that in addition to being coupled to the time-sharing circuitry 44 and 44' and then to the cycle and envelope samplers 116, 118 and 122, 124, respectivley, the Doppler-compensated reference pulses from the servo means 38, 40, and 42 are coupled to timing units 46, 48 and 50, respectively. The reference pulses are here divided into appropriate pulse-repetition periods determined by the command from the control display indicator 26, pass through the phase coding logic and gating network 52, and are coupled to the time-sharing matrix 58, which (as is seen in FIG. 3) couples the reference pulses to the cycle samplers (CS(3), CS(4), etc.) and the envelope samplers (ES(3), ES(4), etc.) in the desired time sequence. As will be understood, the phase coding and logic gating network 52 applies the correct phase coding to the reference signals supplied to it from the timing units 46, 48, and 50, so that all of the pulses detected by the sampling unit 18 will be positive at the outputs of the samples. It may generally be stated that the timing units are used, in addition to the purposes just stated, to update the reference signals by applying computed approximate time differences, which greatly facilitates and speeds initial search and acquisition. This operation is completely set forth in the said copending application Ser. No. 454,033, to which reference is once again made.

Figure 14:
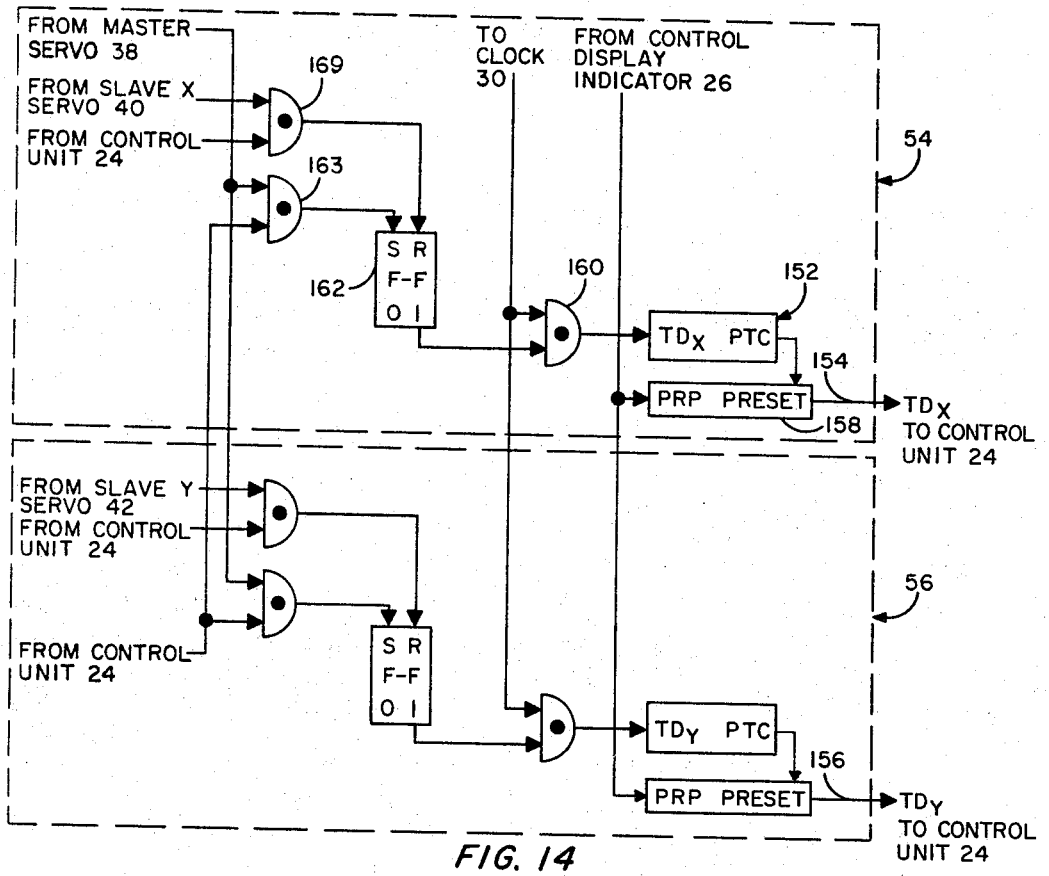
FIG. 14 is a schematic block diagram of a preferred time-difference measuring unit implementation for use in the present system.

The time-difference mesauring units 54 and 56 seen in and described in connection with FIG. 1 are shown schematically in FIG. 14. It will be noted that each of these is a substantially identical unit composed of gating, a flip-flop, and a pulse train counter with a pulse repetition period preset register. The purpose of each of the time-difference units 54 and 56 is to measure with extreme accuracy the time differences between reception of the pulse groups from the Master and Slave X Loran stations (TD$x$), and the time differences between reception of the Master and the Slave Y pulse groups (TD$y$). These time-difference measurements are presented as the output of each of the units at the terminals designated 154 and 156, respectively. As the legends indicate, these time-difference signals are coupled to the control unit 24 which, it will be recalled, (see FIG. 7) actually forms part of the computer organization by which conversion of the time-difference measurements into orthogonal navigation coordinates is accompilshed.

Referring now specifically to unit 54 as exemplary of either time-difference unit, it will be observed that the time-difference measurements are derived by stopping and starting a pulse train counter 152, whose counting modulus is a function of the PRP selected by the control display indicator 26. The counting modulus of PTC 152 is established through the preset register 158. PTC 152 counts a pulse train generated by the central clock 30, which is gated into the counter by a control gate 160. This gate in turn is controlled by the logical "one" output of a flip-flop 162, which enables the second terminal of the gate. Filp-flop 162 is set when a gate 163 is enabled at both terminals. This requires the coincidence of pulses from the Master servo means 38 and from the control unit 24. The flip-flop is reset to stop the count by another gate 169, which is enabled by the coincidence of pulses from the Slave X servo means 40 and the control unit 24. Consequently, it will be seen that at a given point in the Master servo pulse train, a command from the control unit will set the flip-flop and begin the count, whereas at a given point in the Slave X servo pulse train a command from the control unit will reset the flip-flop to end the count. This same system is used in unit 56, except that the Slave Y servo means 42 is involved instead of the Slave X servo 40.

Basically, the foregoing is believed to set forth to persons skilled in this art a full and complete description of the present invention. It will be understood that the control display indicator 26 provides required functions such as power on and off, a select means for different Loran transmitting complexes which generates an appropriate select or command signal representative of the particular PRP involved for each transmitting complex, selecting means for primary or secondary reception areas, a destination select, and further, a command input generating means for inserting present position coordinates and known velocity information into the computer organization, specifically, into the control unit 24. Additionally, as FIG. 1 illustrates and as has been mentioned previously, it is desirable to incorporate a synchro and analog-digital converter means 25 (see FIG. 1), by which inputs such as aircraft velocity, wind information, heading, etc. may be inserted into the navigating instrument from external sources available in the aircraft. Also, the control display indicator 26 should include means for visibly displaying the continuously-computed orthogonal navigation information, as for example a display of Nixie tubes, by which an alpha-numeric display may be obtained. As for the phase coding logic and gating network 52, it will be appreciated that this is a matrix which provides various gated outputs from the multiple inputs supplied to it, and which may be implemented by using phase coding, gating, and delay techniques similar to those used in the timing units 46, 48 and 50, illustrated and described in detail in copending application Ser. No. 454,033.

Operation

Although various aspects of the operation of the present navigation instrument have been set forth previously in connection with the circuitry of the instrument, a somewhat more detailed and more comprehensive description of the operation and of the various operating modes of the system follows. From this, many aspects of the structure of the instrument, including its computer organization, will become even more apparent.

In its overall operation, the present navigation instrument has a variety of relatively distinct and different operating modes. When the aircraft utilizing the instrument is flown into a particular Loran-C tracking area, the instrument is activated by the pilot, who then operates the control-display indicator 26 to insert his approximate present position and velocity into the system. The navigating instrument then proceeds through a predetermined sequence of operations determined and controlled by the control unit 24. These include an Initialization Mode, a Rough Search Mode, a Fine Search Mode, a steady-state Tracking Mode, and a simultaneous Compute mode, in which the conversion from hyperbolic time-difference coordinates to orthogonal latitude-longitude coordinates is performed, together with any of a variety of other computations which may be performed upon the orthogonal information. For example, the pilot may operate the control-display indicator to also insert a pre-selected destination, and the instrument will automatically compute certain steering information including distance to destination, ground speed, bearing, cross-track error, and the like.

In the Initialization mode, the control-display indicator 26 (see FIG. 1) translates the present position information from the decimal form that the pilot actually selects into binary-coded-decimal bits and couples these to the control unit 24. The computing components (see FIG. 7) then cycle to perform a first computation, based upon the inserted position information and stored information relating to the particular Loran complex involved, to arrive at the maximum signal strength which the instrument will receive from any of the stations in the Loran complex. Corresponding signals are then computed and coupled to the RF unit 16 to pre-set its signal-receiving parameters.

Specifically, a binary attenuation signal is coupled to the attenuator 60 (FIG. 2) at its terminal 61 to automatically initiate desired signal attenuation, and a binary AGC signal is coupled to the RF amplifying portions 63, 64, and 65 (FIG. 2) at its input terminals 102, 104, and 106 and the like as is set forth in detail in the previously identified copending application. Thus, the RF unit 16 is automatically pre-set in accordance with computed maximum signal strength to produce a uniform output signal which is coupled to the sampler means 18.

It will be appreciated that by using the computer portion to pre-set the RF receiving portion, the search is initially conducted for the station having the strongest signal, and not for a particular station such as the master. This greatly increases the probability of detecting a known signal, and so reduces in the required search time. Further, in the Tracking Mode the attenuation and AGC are continually adjusted automatically as a function of the actual sampled and integrated signal plus noise.

Once the RF receiving portion 16 has been pre-set or initialized, Rough Search may be begun, under the command of the control unit 24. The purpose of the Rough Search Mode is to detect and identify the Loran signal envelope. Even though the instrument is searching for a definite or specific signal (i.e., the strongest one), the need for a Rough Search Mode will be apparent when the duty cycle of the Loran-C system is considered. That is, for the typical pulse group of eight pulses, the duty cycle varies from 1.6 to 5.3 percent, depending upon the particular PRP. Moreover, generally only the first three cycles of each pulse are considered, since these are free of sky-wave contamination, and this reduces the duty cycle to the range of 0.24 to 0.80 percent. Thus, it is imperative that some means of roughly ascertaining the time of the pulse group within the pulse repetition period must be provided.

This is accomplished in the sampling unit 18, by cross-correlating the received signals with internally-generated continuous-wave reference signals of the same frequency. These signals are generated in the servo means 38, 40, and 42 in the manner that has been set forth in detail previously herein. It will be recalled that these reference signals are Doppler-compensated in the servo means, initially (in Rough Search) in accordance with parameters computed on the basis of the inserted present position information and aircraft velocity information (note the "initial condition" shown in FIG. 6 at (A) (B) and (C)), and subsequently in accordance with parameters based upon the actual measured phase-shift error between the reference signals and the received Loran signals (as illustrated in FIG. 6 at times $t(1)$ and $t(2)$).

As has been explained, the reference signals are initially coupled to the cycle samplers 116 and 118 (FIGS. 3 and 4) through the time-sharing matrix 44, and coupled to the envelope samplers 122 and 124 (FIGS. 3 and 4) through the time-sharing circuit matrix 44'. The signal samplings from the cycle samplers are filtered (FIG. 3) to generate their pulse envelopes, and the resulting envelopes are then themselves sampled by the envelope samplers to produce pulses which are assigned a digital value in the analog-to-digital converters 126 and 128. The digitized samples are then cross-correlated with periodic pulses and resolved in the arithmetic unit 20 into a single signal and this is then decoded in the detector and sequential decoder 22 to determine the phase coding and pulse group location of the signals relative to the Loran PRP. All of this is specifically set forth in detail in the said copending application Ser. No. 454,033, and need not be repeated here.

When a particular Loran pulse group has been detected and identified, the detector and sequential decoder 22 signals the control unit 24, which in turn initiates the Fine Search Mode by an appropriate command. Also, control signals then are sent to the time-difference measuring units 54 and 56 (see FIGS. 1 and 14). In connection with the Rough Search Mode, however, it is to be noted that the computing portion of the navigation instrument acts upon the inserted present position information to compute the approximate time differences between the master and the two slave pulse groupings which are expected to characterize Loran signals received at that particular position. The approximate time differences are used to pre-set the circuitry in the timing units 46, 48, and 50, so that Fine Search techniques may be implemented immediately upon completing the Rough Search for the signals from one transmitting station. This is set forth in considerable detail in the said copending application Ser. No. 454,033, and need not be elaborated upon here.

In the Fine Search Mode of operation, the Loran pulses are precisely identified so that the actual time differences between the reception of pulses from each of the three Loran transmitters can be accurately measured. At the conclusion of the Rough Search mode, the received signals have been identified by their phase coding relationships as to master or slave, and, it will be recalled, from the results of the Initialization Mode, the attenuation, AGC, approximate time differences, and the Doppler shift relative to all three Loran signals will have been determined. Therefore, during the Fine Search Mode it is possible to search for all three signals simultaneously by utilizing the appropriate gating techniques discussed throughout this specification. Further, it is to be noted that in the Fine Search mode it is only necessary to search over that portion of the Loran PRP in which the actual Loran pulse groupings are expected.

The basic consideration in Fine Search is to precisely identify a given point on the Loran pulse envelope, such as the standard sampling point. As has been stated, this occurs between twenty-five and thirty-five microseconds after the beginning of the pulse. The phase relationship between the incoming signal and the reference signal is readily determined upon termination of the Rough Search Mode through the operation of the sampling and integrating techniques discussed in connection with FIG. 3 in which the samplings from the eight pulses in a single Loran pulse grouping are summed into a single high-energy pulse, which is then cross-correlated with stored valves of the ideal Loran signal in accordance with a cross-correlation constant generated in the arithmetic unit 20 and the readwrite memory 34, in order to determine the sampling point. Accordingly, most of the functional component groupings making up the present integrated navigation instrument are used in the Fine Search Mode, with the exception of the control-display indicator 26, the read-only memory 32, the control unit 24, and the time-difference measuring units 54 and 56.

Actually, it will be clear to those skilled in the art that a number of approaches may be utilized for the Fine Search Mode, including the more conventional derived envelope approach, or certain non-linear techniques such as zero-crossing detectors. However, it should be stated that by first using a cycle sampler and then a delayed envelope sampler, as is set forth herein, it is possible to detect the envelope of the Loran signal with great accuracy, within plus or minus five micro-seconds.

At the conclusion of the Fine Search operation the proper gating signals for the RF unit 16, the sampler unit 18, the arithmetic unit 20, and the three servo means 38, 40, and 42 will have been established. As has been fully discussed earlier in this specification in connection with FIGS. 4 and 5, the three digital servo loops including the three Type II servos 38, 40 and 42 may be closed at this point through the operation of the first integrating means 170, which functions on a time-shared basis with each of the digital servos, so that each servo then operates closed-loop to track the incoming Loran signals.

As has been stated, the phase-shift error between the internal reference signals and the Loran pulses is continuously measured and provides the input to the integrating means 170. This produces a change in the timing signal fed into the overflow integrator 172 which effects a shift in the phase of the reference signals corresponding to the measured phase error. This operates the samples to reduce the phase error to zero. In this manner, the internally-generated reference signals are continuously updated in accordance with the Doppler-shifted Loran carrier signal in order to constantly track the latter. As has been indicated, the reference signals from the digital servos 38, 40, and 42 pass through the timing units 46, 48, and 50 before they actually operate to gate the sampling means 18, and correction signals may be applied at the timing units in the manner which is fully set forth in the said copending application Ser. No. 454,033, in order to precisely synchronize the internal timing of the receiver with that of the transmitted pulses.

In the Tracking Mode of operation then, the samplers 18, the timing loops, and the servo loops are all closed and tracking each of the three received Loran signals, the digital sampler outputs now preferably being filtered by the digital filtering techniques noted previously, rather than being integrated as in the Search Modes. The Loran time-difference information is continually measured, and the internal reference signal is continually Doppler-compensated by the digital servos 38, 40, and 42 and continually updated in the timing units 46, 48, and 50 during tracking. The measured time differences produced by units 54 and 56 are coupled directly into the control unit 24, and the computer organization is used to continually compute orthogonal navigating information from the hyperbolic frame of reference established by the time differences.

Once the orthogonal latitude and longitude is known, it will be clear that the computer organization may readily be utilized to calculate range, bearing, ground speed, track angle, and cross-track error with respect to a preselected destination. Computing is performed simultaneously with the continual tracking, and the computer organization previously described will provide the aforementioned orthogonal information at the rate of ten solutions per second. Additionally, this computer organization will also provide the capability of computing a Loran memory mode of operation, or a dead-reckoning mode, in which stored values of the most recent position and velocity information are utilized by the computing portion to extrapolate or compute approximated parameters for the continued operation of the instrument. This mode may be used to navigate in areas not covered by Loran-C, or during the signal search period, or in the event of a transmitter failure or malfunction in the RF unit of the present instrument.

Having now fully set forth the concepts underlying the present novel navigating instrument, having also set forth preferred embodiments and implementations of many of the functional component grouping to be utilized therein, and having further related complete cycles of its operation, it will be clear to those skilled in the art that the present invention constitutes a significant step forward in navigating techniques and also in the achievement of maximum economy and reliability in the construction of such units. Obviously a variety of specific physical implementations of the inventive concepts involved are possible, as are various modifications and alterations in the specific circuits presented herein. Accordingly, all such implementations, variations, and modifications are to be considered as within the scope of the claims appended herebelow, unless these claims by their language specifically state otherwise.

We claim:

1. An electronic navigation instrument having receiving and computing means for providing to high-performance aircraft and the like substantially instantaneous orthogonal coordinate navigating information from the radio signals of a predetermined complex of transmitting stations, said instrument comprising: RF receiver means for receiving said radio signals; circuit means for varying the operation of said receiver means in response to predetermined control signals; means for determining time-difference information from preselected portions of the signals received; means for automatically and substantially instantaneously computing present aircraft position in orthogonal coordinates from said time-difference information; pilot-operable control means for initially inserting present position information known to the pilot into the said computing means; input means for inserting present aircraft velocity information into the said computing means; circuitry operatively interconnecting all of the aforesaid means; said computing means initially acting upon said inserted position and velocity information to compute anticipated Doppler effects upon at least some of the signals from said complex and provide first control signals representative of said computed Doppler effects;

said interconnecting circuitry connecting said first control signals to said RF receiver means to automatically vary the operation of and thereby pre-set said receiver means in accordance with said computed Doppler effects to facilitate the initial reception of said signals; said computing means then acting upon said computed position information and said inserted velocity information to continuously compute the Doppler effects upon at least some of the signals from said complex and provide second control signals representative of the latter Doppler effects; and said interconnecting circuitry further connecting said second control signals to said RF receiver means to automatically and continuously vary the operation thereof and thereby set said receiver means in accordance with said continuously-computed Doppler effects to facilitate the continued reception of said signals.

2. The navigation instrument of claim 1, wherein said circuit means responsive to said control signals includes means for generating an internal reference signal and said receiver means includes means for sampling said received signals over intervals determined by said reference signal, and wherein the operation of said receiver means is pre-set and set by varying the said reference signal and thereby varying said sampling intervals.

3. The navigation instrument of claim 1, wherein said first and said second control signals provided by said computing means are representative of anticipated Doppler effects upon the signals from each of the transmitting stations in said complex, and wherein said circuit means in response to both said first and said second control signals varies the operation of and thereby automatically presets said receiver means to facilitate both the initial and the continuous reception of signals from each of said transmitting stations.

4. An electronic navigation instrument having receiving and computing means for providing to high-performance aircraft and the like substantially instantaneous orthogonal coordinate navigating information from the radio signals of a predetermined complex of transmitting stations, said instrument comprising: RF receiver means for receiving said radio signals; circuit means for varying the operation of said receiver means in response to predetermined control signals: means for determining time-difference information from preselected portions of the signals received; means for automatically and substantially instantaneously computing present aircraft position in orthogonal coordinates from said time-difference information; pilot-operable control means for initially inserting present position information known to the pilot into the said computing means; input means for inserting present aircraft velocity information into the said instrument; circuitry operatively interconnecting all of the said means; said computing means initially acting upon said inserted present position and velocity information to compute anticipated Doppler effects upon at least some of the signals from said complex and provide first control signals representative of such Doppler effects; said interconnecting circuitry connecting said first control signals to said RF receiver means to automatically vary the operation of and thereby pre-set said receiver means in accordance with said computed Doppler effects to facilitate the initial acquisition and reception of said signals; said computing means then acting upon said computed position information to compute present aircraft velocity; said computing means further continuously acting upon said computed aircraft velocity and computed position information to compute theoretically actual Doppler effects upon at least some of the signals from said complex and provide second control signals representative of said theoretically actual Doppler effects; and said interconnecting circuitry further connecting said second control signals to said RF receiver means to automatically and continuously vary the operation of and thereby continuously set said receiver means in accordance with said computed theoretically actual Doppler effects to facilitate the continued reception of said signals.

5. An electronic navigation instrument having receiving and computing means for providing to high-performance aircraft and the like substantially instantaneous orthogonal coordinate navigating information from the radio signals of predetermined complex of transmitting stations, said instrument comprising; RF receiver means for receiving said radio signals; circuit means for varying the operation of said receiver means in response to predetermined control signals; means for determining time-difference information from preselected portions of the signals received; means for automatically and substantially instantaneously computing present aircraft position in orthogonal coordinates from said time-difference information; pilot-operable control means for initially inserting present position information known to the pilot into the said computing means; input means for inserting present aircraft velocity information into the said computing means; circuitry operatively interconnecting all of the said means; said computing means initially acting upon said inserted present position and velocity information to compute anticipated Doppler effects upon at least some of the signals from said complex and provide first control signals representative of such Doppler effects; said interconnecting circuitry connecting said first control signals to said circuit means to automatically vary the operation of and thereby pre-set said receiver means in accordance with said computed anticipated Doppler effects to facilitate the initial acquisition and reception of said signals; said computing means then acting upon the received signals to substantially continuously determine the actual Doppler effect upon at least some of the signals from said complex and provide second control signals representative of such actual Doppler effect; and said interconnecting circuitry further connecting said second control signals to said circuit means to automatically and continuously vary the operation of and thereby set said receiver means in accordance with said determined actual Doppler effects to facilitate the continued reception of said signals.

6. The navigation instrument of claim 5, wherein said circuit means responsive to said control signals includes means for generating an internal reference signal and said receiving means includes means for sampling said received signals at intervals determined by said reference signal, wherein said actual Doppler effect determination is accomplished by said computing means comparing said received signals to said reference signal, and wherein the operation of said receiver means is pre-set and set by varying the said reference signal and thereby varying said sampling intervals.

7. An electronic navigation instrument having receiving and computing means for providing to high-performance aircraft and the like substantially instantaneous orthogonal coordinate navigating information from the radio signals of a predetermined complex of transmitting stations, said instrument comprising: RF receiver means for receiving said radio signals; circuit means for varying the operation of said receiver means in response to predetermined control signals; means for determining time-difference information from preselected portions of the signals received; computer means for performing desired computations including automatically and substantially instantaneously computing present aircraft position in orthogonal coordinates from said time-difference information; circuitry operatively interconnecting all of the said means; said computing means acting upon said computed position information to compute present aircraft velocity; said computing means including memory apparatus and continuously storing the said computed position and velocity information in said memory apparatus; said computing means acting upon said computed aircraft velocity and position information to continuously compute the Doppler effects upon at least some of the signals from said complex and provide first control signals representative of such Doppler effects; said interconnecting circuitry coupling said control signals to said circuit means to continuously and automatically vary the operation of and thereby set said receiver means in accordance with said computed Doppler effects to facilitate the continuous reception of said signals; and said computing means acting upon said stored position and velocity information in the event said signals are lost and fresh time-difference determinations cannot be made, to produce approximated Doppler effects based upon said stored values and to provide second control signals representative of such approximated Doppler effects; said interconnecting circuitry then coupling said second control signals to said circuit means to vary the operation of and thereby set said receiver means in accordance with said approximated Doppler effects.

8. The navigation instrument of claim 7, wherein said circuit means responsive to said control signals includes means for generating an internal reference signal and said receiver means includes means for sampling said received signals at intervals determined by said reference signal, and wherein the operation of said receiver means is both preset and set by varying the said reference signal and thereby varying said sampling intervals.

9. An electronic navigation instrument having receiving and computing means for providing to high-performance aircraft and the like substantially instantaneous orthogonal coordinate navigating information from the radio signals of a predetermined complex of transmitting stations, said instrument comprising: RF receiver means for receiving said radio signals; circuit means for varying the operation of said receiver means in response to predetermined control signals; means for determining time-difference information from preselected portions of the signals received; computer means for performing desired computations including automatically and substantially instantaneously computing present aircraft position in orthogonal coordinates from said time-difference information; pilot operable control means for initially inserting present position information known to the pilot into the said computing means; input means for inserting present aircraft velocity information into the said computing means; circuitry operatively interconnecting all of the said means; said computing means initially acting upon said inserted present position and velocity information to compute anticipated Doppler effects upon at least some of the signals from said complex and provide first control signals representative of such anticipated Doppler effects; said interconnecting circuitry coupling said first control signals to said circuit means to automatically vary the operation of and thereby pre-set said receiver means in accordance with said computed anticipated Doppler effects to facilitate the initial acquisition and reception of said signals; said computing means then acting upon said computed position information to compute present aircraft velocity; said computing means then acting upon said computed position information and computed velocity information to continuously compute the Doppler effects upon at least some of the signals from said complex and provide second control signals representative of such computed Doppler effects; said computing means including memory apparatus and continuously storing the said computed position and velocity information in said memory apparatus; said interconnecting circuitry further coupling said second control signals to said circuit means to automatically and continuously vary the operation of and thereby set said receiver means in accordance with said computed Doppler effects to facilitate the continued reception of said signals; and said computing means acting upon said stored position and velocity information in the event said signals are lost and fresh time-difference determinations cannot be made, to compute approximated Doppler effects based upon said stored values and provide third control signals representative of said approximated Doppler effects; said interconnecting circuitry coupling said third control signals to said circuit means to then vary the operation of and thereby set said receiver means in accordance with said computed approximated Doppler effects.

10. An electronic navigation instrument having receiving and computing means for providing to high-performance aircraft and the like substantially instantaneous orthogonal coordinate navigating information from the radio signals of a predetermined complex of transmitting stations, said instrument comprising: RF receiver means for receiving said radio signals; circuit means for varying the operation of said receiver in response to predetermined control signals; means for determining time-difference information from preselected portions of the signals received; computer means for performing desired computations including automatically and substantially instantaneously computing present aircraft position in orthogonal coordinates from said time-difference information; pilot-operable control means for initially inserting present position information known to the pilot into the said computer means; input means for inserting present aircraft velocity information into the said computer means; circuitry operatively interconnecting all of the said means; said computing means initially acting upon said inserted present position and velocity information to compute anticipated Doppler effects upon at least some of the signals from said complex and provide first control signals representative of such computed anticipated Doppler effects; said interconnecting circuitry coupling said first control signals to said circuit means responsive thereto to automatically vary the operation of and thereby pre-set said receiver means in accordance with said computed anticipated Doppler effects, to facilitate the initial acquisition and reception of said transmitted signals; said computing means acting upon said computed position information to compute present aircraft velocity; said computing means acting upon the received signals to substantially continuously determine the actual Doppler effects upon at least some of the signals from said complex and produce second control signals representative of such actual Doppler effects; said interconnecting circuitry further coupling said second control signals to said circuit means responsive thereto to automatically and continuously vary the operation of and thereby set said receiver means in accordance with said determined Doppler effects, to facilitate the continued reception of said signals; said computing means including memory apparatus and continuously storing the said computed position and velocity information in said memory apparatus; and said computing means acting upon said stored position and velocity information in the event said signals are lost and further actual Doppler effects cannot be determined to produce approximated Doppler effects based upon said stored values and produce third control signals representative of such approximated Doppler effects; said interconnecting circuitry coupling said third control signals to said circuit means responsive thereto to vary the operation of and thereby set said receiver means in accordance with said approximated Doppler effects.

11. The navigation instrument of claim 10, wherein said circuit means responsive to said control signals includes means for generating an internal reference signal, and said receiver means includes means for sampling said received signals at intervals determined by said reference signal, wherein said actual Doppler effect determination is accomplished by comparing samplings of said received signals to said reference signal, and wherein said receiver means is pre-set and set by said circuit means through varying said reference signal and thereby varying said receiver means sampling intervals.

12. A method of facilitating both initial signal search and acquisition and continuous signal reception in conjunction with a navigating instrument of the type having receiving and computing means for providing substantially instantaneous orthogonal coordinate navigating information from the radio signals of a predetermined complex of transmitting stations, said method comprising the steps: inserting approximately known present position information into said computing means; inserting present velocity information into said computing means; using said computer means to initially compute anticipated Doppler shift of signals to be received at said present position from said inserted information; pre-setting at least some of the operational parameters of the said receiving means in accordance with said anticipated Doppler information to facilitate and speed initial acquisition and reception of said signals; then upon receiving said signals using said computer means to compute present orthogonal position information from the received signals; using said computer means to compute present velocity information from the computed position information; using said computer means to continuously compute Doppler shift information regarding the signals being received from the said computed position and velocity information; and setting at least some of the operational parameters of said receiving means in accordance with said computed Doppler information to facilitate continuous reception of said signals.

13. A method of facilitating both initial signal search and acquisition and continuous signal reception in conjunction with a navigating instrument of the type having receiving and computing means for providing substantially instantaneous orthogonal coordinate navigating information from the radio signals of a predetermined complex of transmitting stations, said method comprising the steps: inserting approximately known present position information into said computing means; inserting present velocity information into said computing means; using said computer means to initially compute anticipated Doppler shift of signals to be received at said present position from said inserted information; pre-setting at least some of the operational parameters of the said receiving means in accordance with said anticipated Doppler information to facilitate and speed initial acquisition and reception of said signals; then upon receiving said signals using said computer to measure the actual Doppler effect of the signals received; and setting at least some of the said operational parameters of said receiving means in accordance with said measured Doppler information to facilitate continuous reception of said signals.

14. A method of facilitating both initial signal search and acquisition and continuous signal reception in conjunction with a navigating instrument of the type having receiving and computing means for providing substantially instantaneous orthogonal coordinate navigating information from the radio signals of a predetermined complex of transmitting stations, said method comprising the steps: inserting approximately known initial position information into said computing means; inserting initial velocity information into said computing means; initially using said computer to compute anticipated Doppler shift information regarding signals to be received at said initial position from said inserted information; pre-setting at least some of the operational parameters of the said receiving means in accordance with said anticipated Doppler information to facilitate and speed initial acquisition and reception of said signals; then upon receiving said signals using said computer to compute present position information from the radio signals received; using said computer to compute present velocity information from said computed position information; using said computer to continuously compute Doppler shift information regarding the reception of signals from the said computed position and velocity information; setting at least some of the operational parameters of said receiving means in accordance with said computed Doppler information to facilitate continuous reception of said signals; continuously storing values of said computed position and velocity information in memory apparatus; and using said computer means to compute approximated Doppler shift information from said stored position and velocity information for use in setting said receiving means parameters in the event said signals cease to be received.

15. A method of facilitating both initial signal search and acquisition and continuous signal reception in conjunction with a navigating instrument of the type having receiving and computing means for providing substantially instantaneous orthogonal coordinate navigating information from the radio signals of a pre-determined complex of transmitting stations, said method comprising the steps: inserting approximately known initial position information into said computing means; inserting initial velocity information into said computing means; initially using said computer to compute anticipated Doppler shift information regarding signals to be received at said initial position from said inserted information; pre-setting at least some of the operational parameters of the said receiving means in accordance with said anticipated Doppler information to facilitate and speed initial acquisition and reception of said signals; then upon receiving said signals using said computer to compute present position information from the radio signals received; using said computer to compute present velocity information from said computed position information; using said computer means to measure the actual Doppler effect upon the signals received; setting at least some of the operational parameters of said receiving means in accordance with said measured Doppler information to facilitate continuous reception of said signals; continuously storing values of said computed position and velocity information in memory apparatus; and using said computer means to compute approximated Doppler shift information from said stored position and velocity information for use in setting said receiving means parameters in the event said signals cease to be received and the actual Doppler effect cannot be measured.

16. An electronic navigation instrument having receiving and computing means for providing to high-performance aircraft and the like substantially instantaneous orthogonal coordinate navigating information from the radio signals of a predetermined complex of transmitting stations, said instrument comprising: RF receiver means for receiving said radio signals; circuit means including means for generating an internal reference signal for varying the operation of said receiver means in response to predetermined control signals; said receiver means including means for sampling said received signals at intervals determined by said reference signal wherein said receiver is preset by varying said reference signal and thereby varying said sampling intervals; means for automatically and substantially instantaneously computing orthogonal coordinate information from the received signals; pilot-operable control means for initially inserting present position information known to the pilot into the said computing means; input means for inserting present aircraft velocity information into said computing means; and circuitry operatively interconnecting all of said means; said computing means acting upon said inserted position and velocity information to compute anticipated Doppler effects upon at least some of the signals to be received from said complex; and provide control signals representative of such Doppler effects; and said interconnecting circuitry connecting said control signals to said circuit means to automatically vary the operation of and thereby preset said receiver means in accordance with said computed Doppler effects, to facilitate the initial reception of said signals.

17. The navigation instrument of claim 16, wherein said computing means provides control signals representative of anticipated Doppler effects upon the signals from each of the transmitting stations in said complex, and wherein said circuit means in response to such control signals varies the operation of and thereby automatically preset said receiver means to facilitate the initial reception of signals from each of said transmitting stations.

References Cited

UNITED STATES PATENTS

| | | | |
|---|---|---|---|
| 3,020,545 | 2/1962 | Losher | 343—103 |
| 3,113,313 | 12/1963 | Roberts | 343—150.272 |
| 3,174,151 | 3/1965 | Abourezk | 343—103 |
| 3,204,241 | 8/1965 | Bjorkman | 343—103 |
| 3,281,845 | 10/1966 | Bjorkman | 343—105 X |
| 3,151,322 | 9/1964 | Hildebrandt | 343—7.3 X |

RODNEY D. BENNETT, *Primary Examiner.*

CHESTER L. JUSTUS, *Examiner.*

H. C. WAMSLEY, *Assistant Examiner.*